United States Patent [19]
Grigsby et al.

[11] Patent Number: 6,164,584
[45] Date of Patent: Dec. 26, 2000

[54] WINDING MACHINE

[75] Inventors: David Grigsby, Medway; Eric Kirker, Vandalia, both of Ohio

[73] Assignee: Odawara Automation Inc., Tipp City, Ohio

[21] Appl. No.: 09/368,367

[22] Filed: Aug. 4, 1999

[51] Int. Cl.[7] .................................................. H02K 15/09
[52] U.S. Cl. ................................. 242/433.2; 242/433.4; 242/419.4
[58] Field of Search ............................. 242/433.2, 433.4, 242/433.1, 419.4; 29/605, 596

[56] References Cited

U.S. PATENT DOCUMENTS

| | | | |
|---|---|---|---|
| 1,503,254 | 7/1924 | Sippel et al. | 242/433.2 |
| 1,986,373 | 1/1935 | Shippy et al. | 242/433.2 |
| 2,468,365 | 4/1949 | Green | 242/433.2 |
| 4,174,815 | 11/1979 | Dammar | 242/433.4 |
| 4,520,965 | 6/1985 | Kimura et al. | 242/433.4 |

*Primary Examiner*—Katherine A. Matecki
*Attorney, Agent, or Firm*—Thompson Hine & Flory LLP

[57] ABSTRACT

An apparatus for winding a wire about a component having a plurality of slots. The apparatus includes a rotatable gripper mechanism for gripping the component and rotating the component about a transverse axis of the component, the gripper mechanism being shaped to guide the wire into a slot of the component. The apparatus also includes a wire guide for guiding the wire into the slot of the component as the component is rotated about the transverse axis.

44 Claims, 36 Drawing Sheets

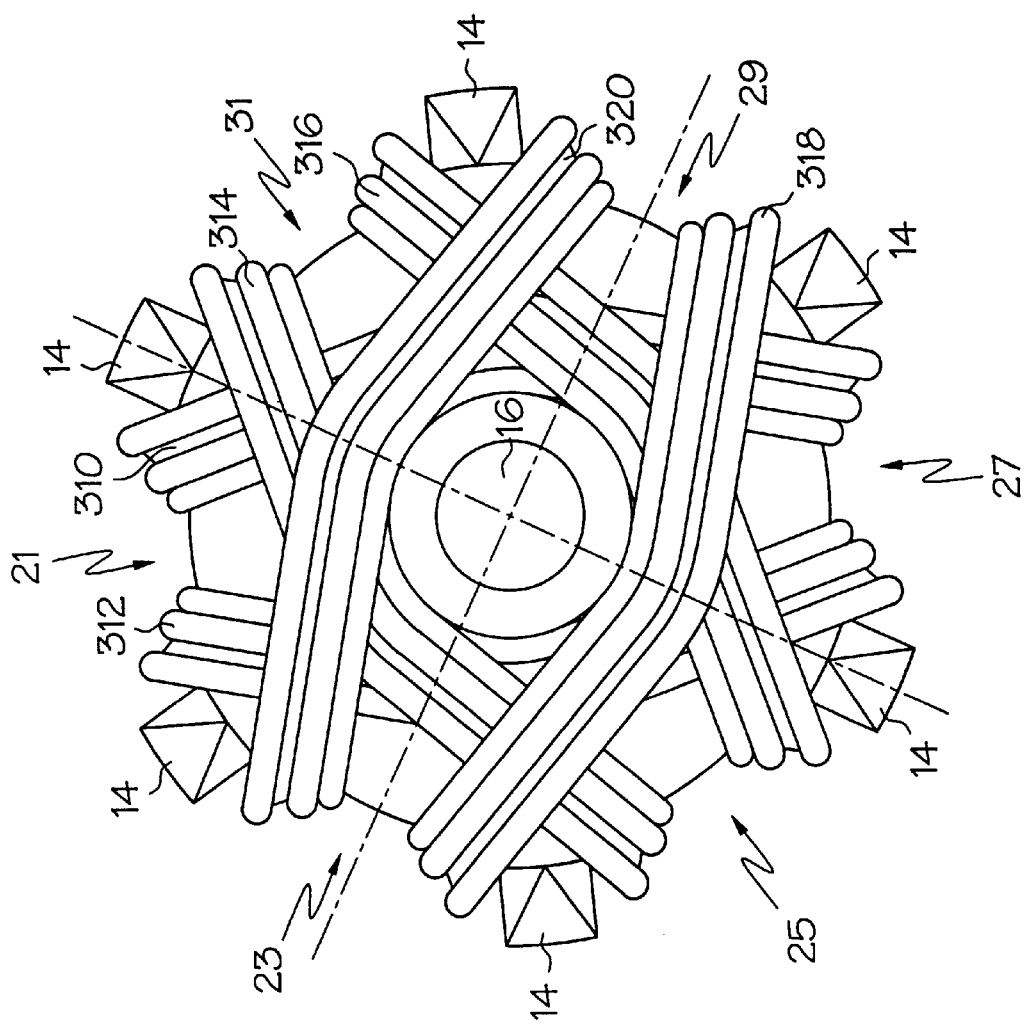

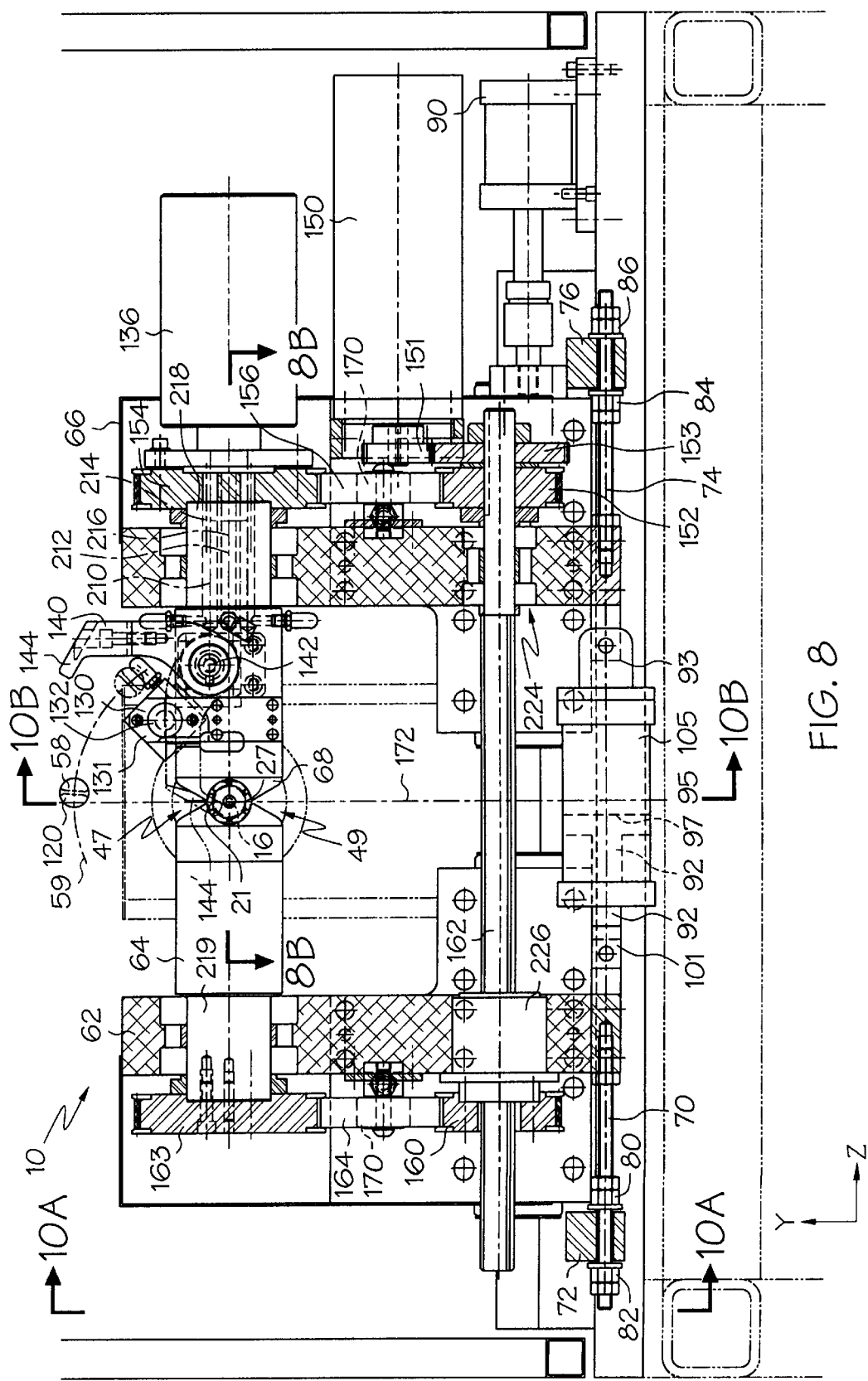

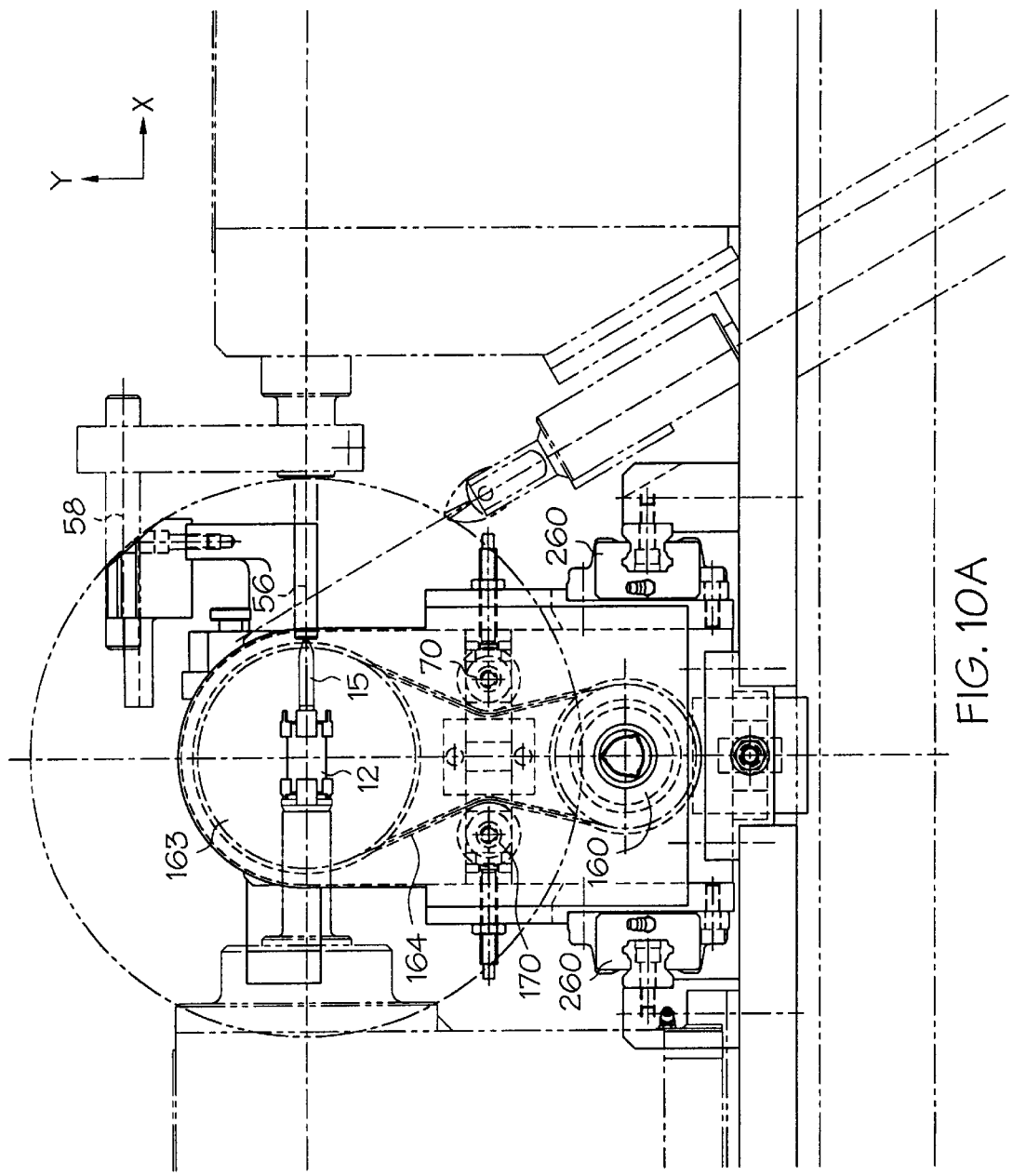

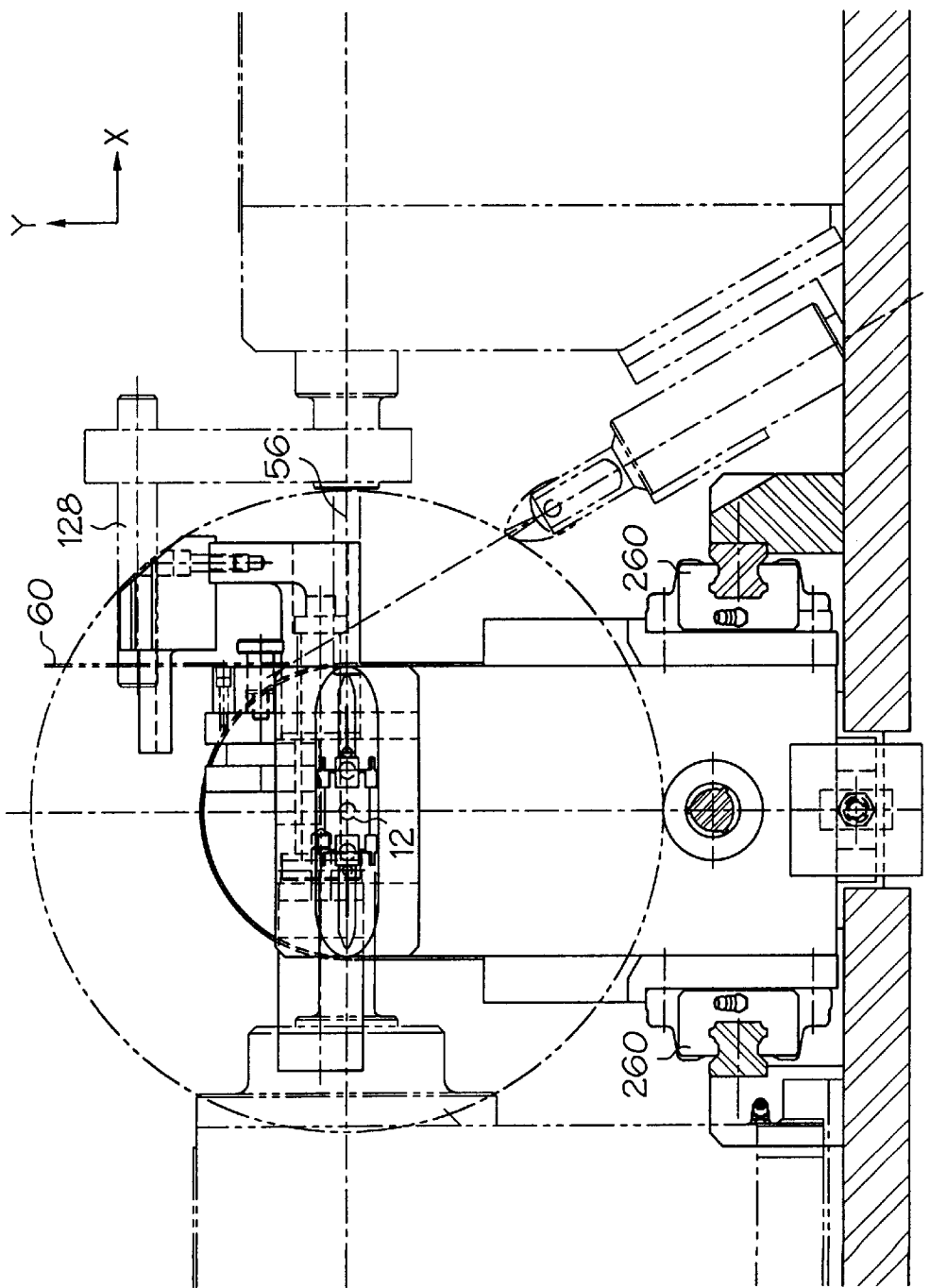

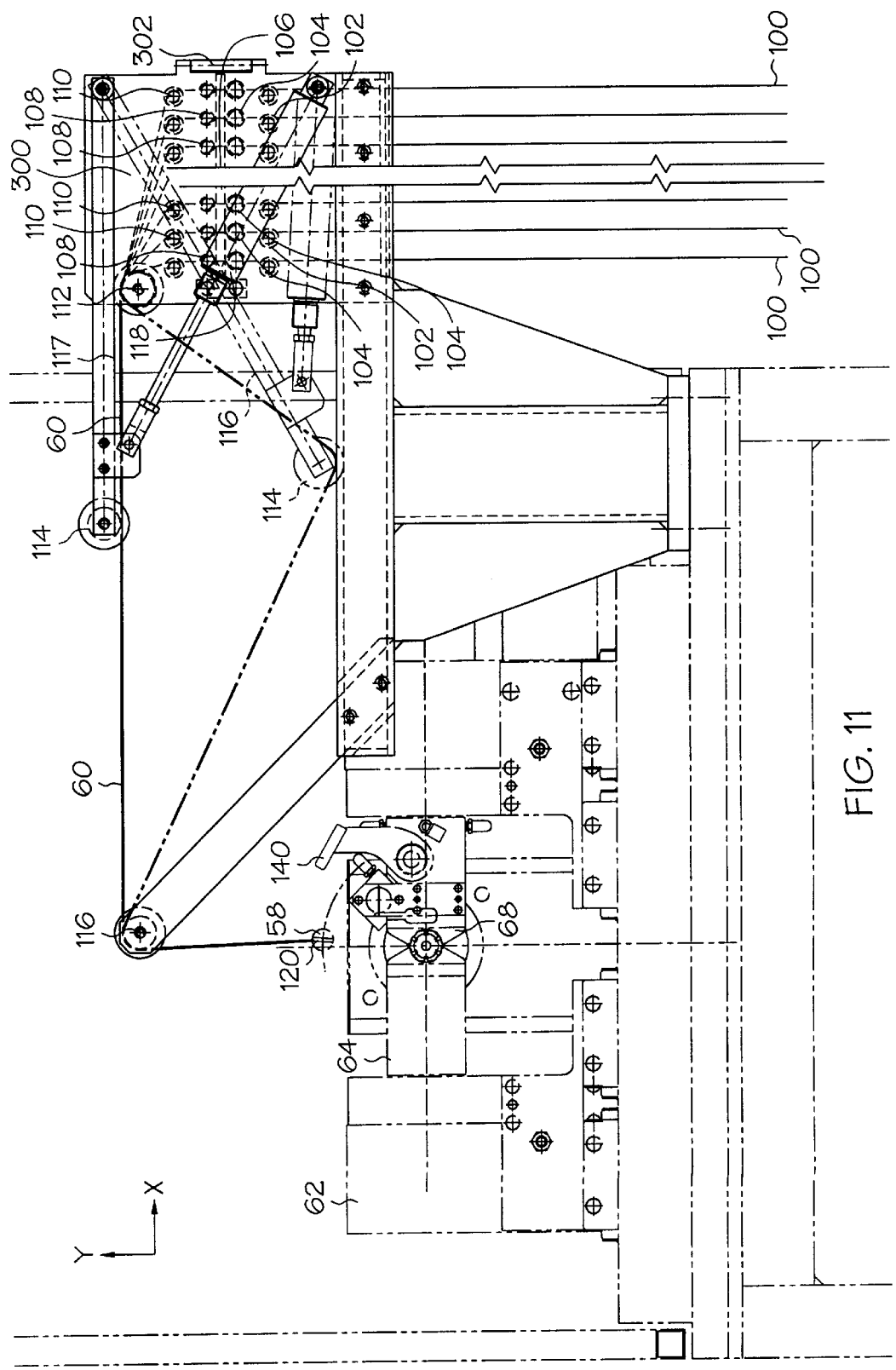

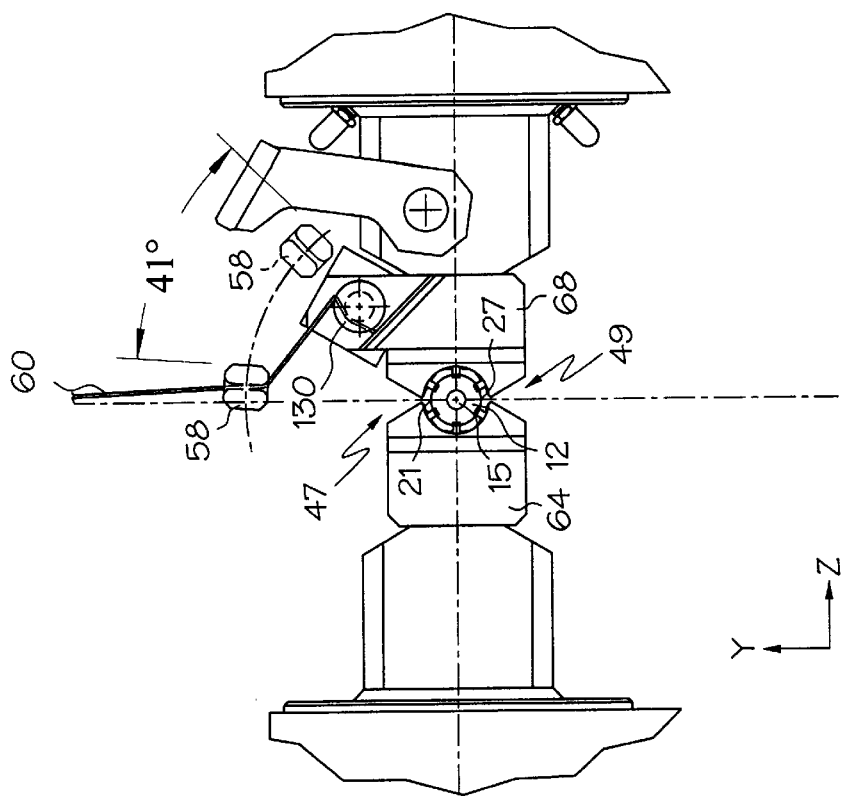
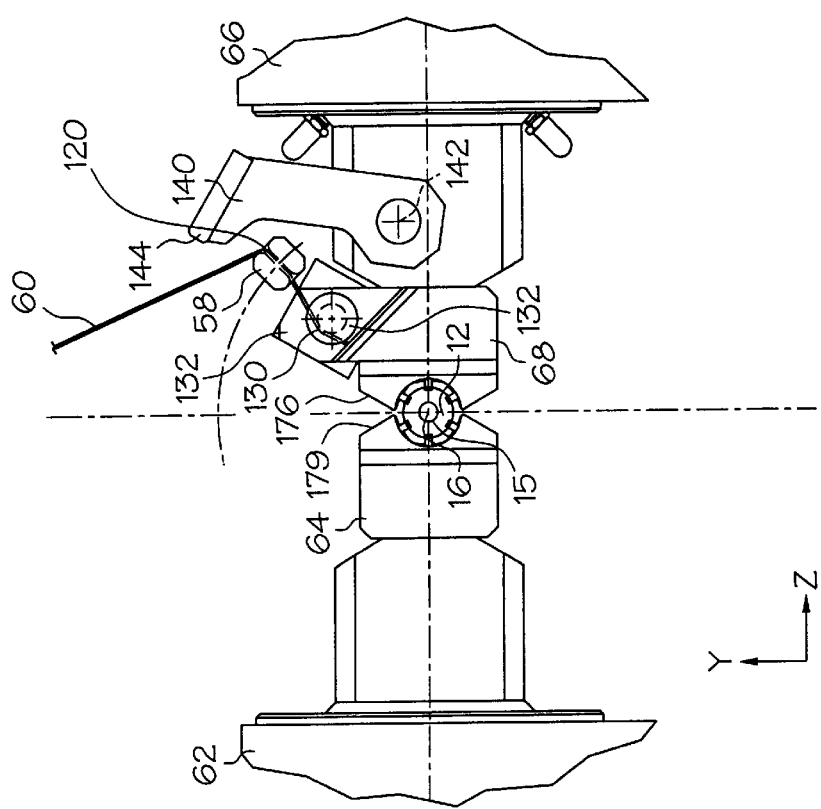

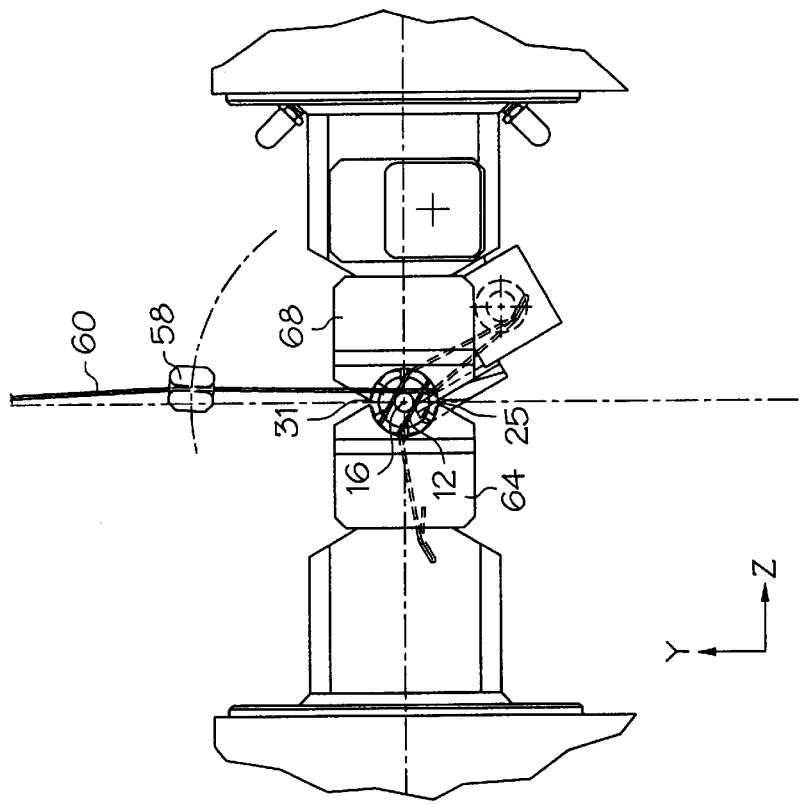
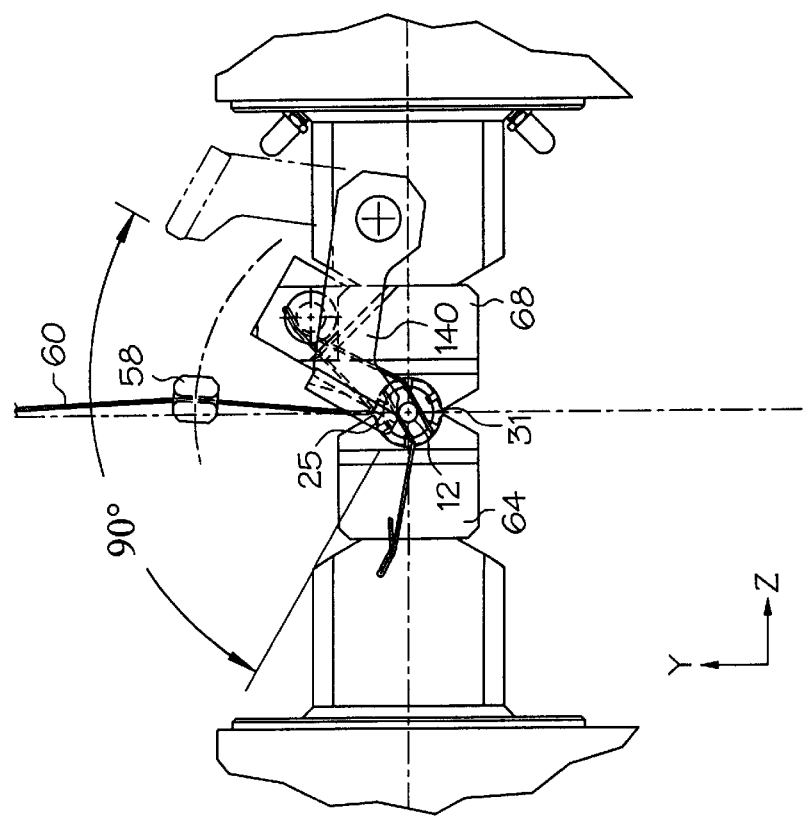

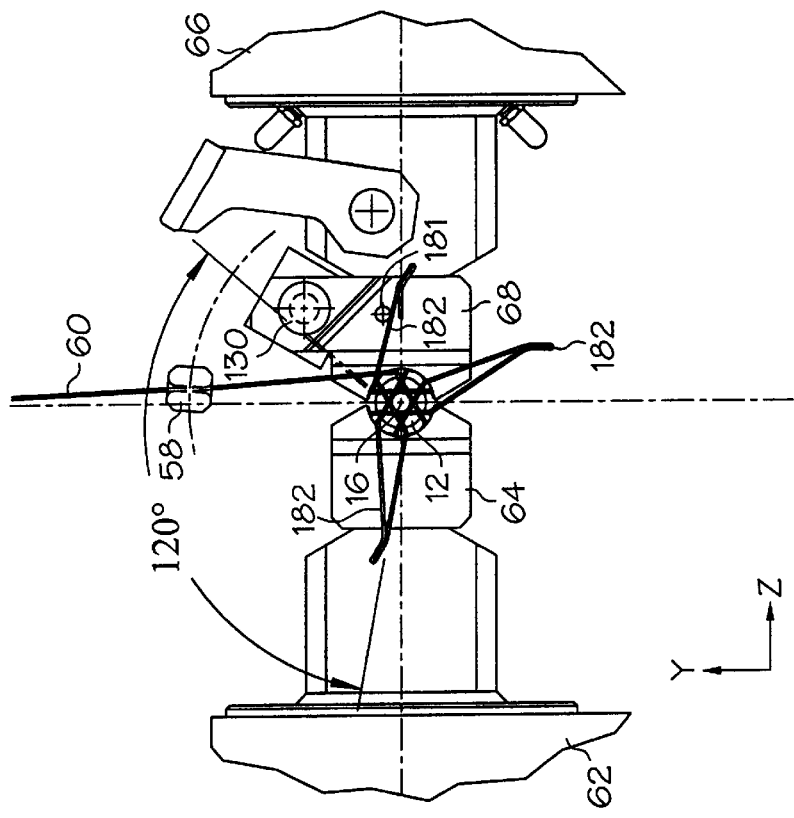
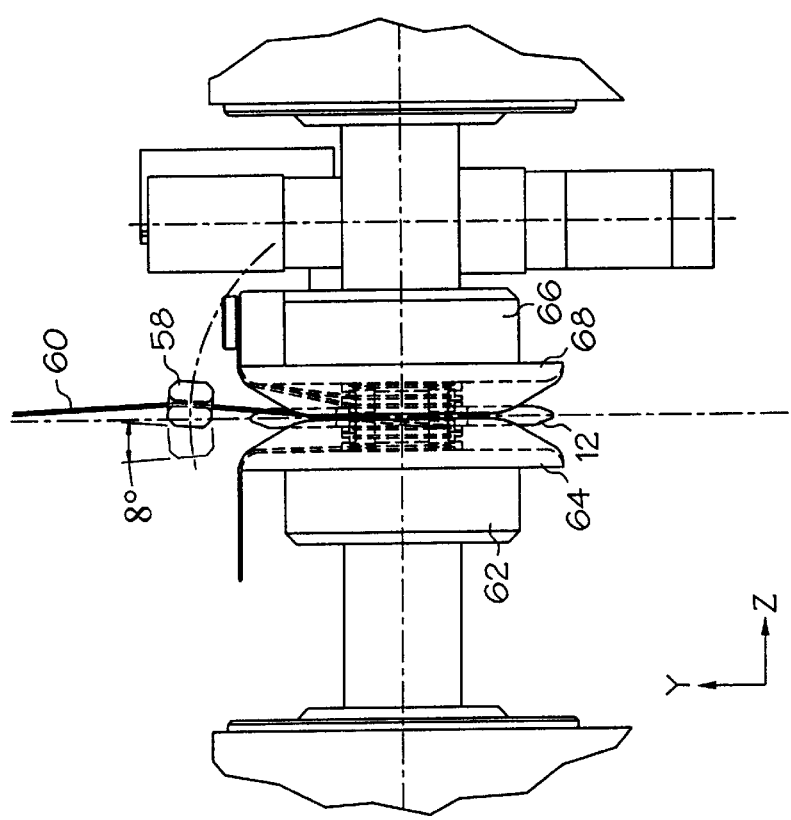

WINDING MACHINE

BACKGROUND OF THE INVENTION

The present invention is directed to a machine for winding armatures, stators, and other electric motor components.

When winding a coil of wire around a stator body in a typical winding machine, the stator body is held stationery while the wire is wound around the stator body. In some cases, it may be desired to wind a "bundle" of several wires around the stator core in order to produce a more powerful motor. For example, such a winding operation may be used in manufacturing three-phase DC motors. However, existing winding machines may have difficulty in winding a bundle of wires around the stationery stator core due to the stiffness of the bundle of wires.

The stator body to be wound may also include a central shaft, and it may be desired to wind a wire or bundle of wires in a slot in the stator on either side of the central shaft. Thus a winding machine that places windings in a stator slot on either side of the central shaft, and which does so in a manner that reduces cycle time, wasted materials, and wasted motion, is desired.

SUMMARY OF THE INVENTION

The present invention is directed to a winding machine that can wind a bundle of wires around a stator core in a quick and efficient manner, and that can wind a wire in a slot on either side of a shaft quickly and efficiently. The bundle of wires are fed into a slot in the stator core, and the stator core is then rotated end-to-end to wind the bundle of wires around the stator core. In this manner, the stator core pulls the wire around it as it is rotated, and also bends and conforms the wire to the stator core shape. The winder also includes a movable wire guide that guides the wire into the desired position in a slot. Thus the winder can wind a single wire in a slot of a stator body on either side of the central shaft.

In one embodiment, the invention is an apparatus for winding a wire about a component having a plurality of slots. The apparatus includes a rotatable gripper mechanism for gripping the component and rotating the component about a transverse axis of the component, the gripper mechanism being shaped to guide the wire into a slot of the component. The apparatus also includes a wire guide for guiding the wire into the slot of the component as the component is rotated about the transverse axis.

Other objects and advantages of the present invention will be apparent from the following description, the accompanying drawings and the appended claims.

BRIEF DESCRIPTION OF THE DRAWINGS

FIG. 1A is an end view of a wound stator core;

FIG. 8 is a front view of the tooling assemblies of the winder of the present invention, shown with a stator core between the tooling assemblies;

FIG. 10A is an end view of the tooling assemblies of taken along line 10A—10A of FIG. 8;

FIG. 10B is an cross section view of the tooling assemblies taken along line 10B—10B of FIG. 8;

FIG. 11 is a front view if the tooling assemblies of the winder of the present invention, with a stator core between the tooling assemblies, shown with a wire feed mechanism;

FIGS. 13–43 are front views showing the preferred steps for winding a stator core using the winder of the present invention.

DETAILED DESCRIPTION

Figure 1:
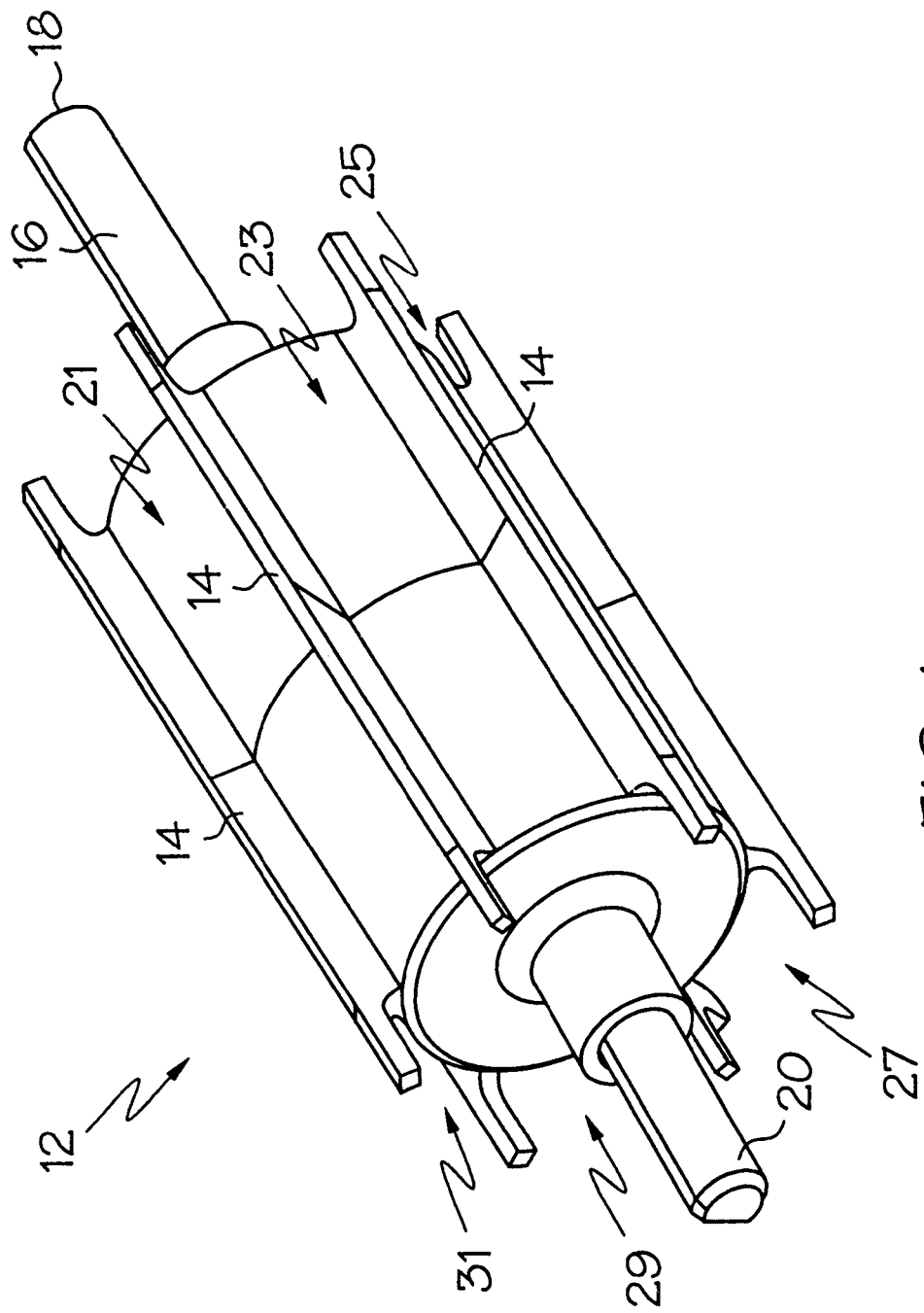
FIG. 1 is a perspective view of an unwound stator core.
Figure 2:
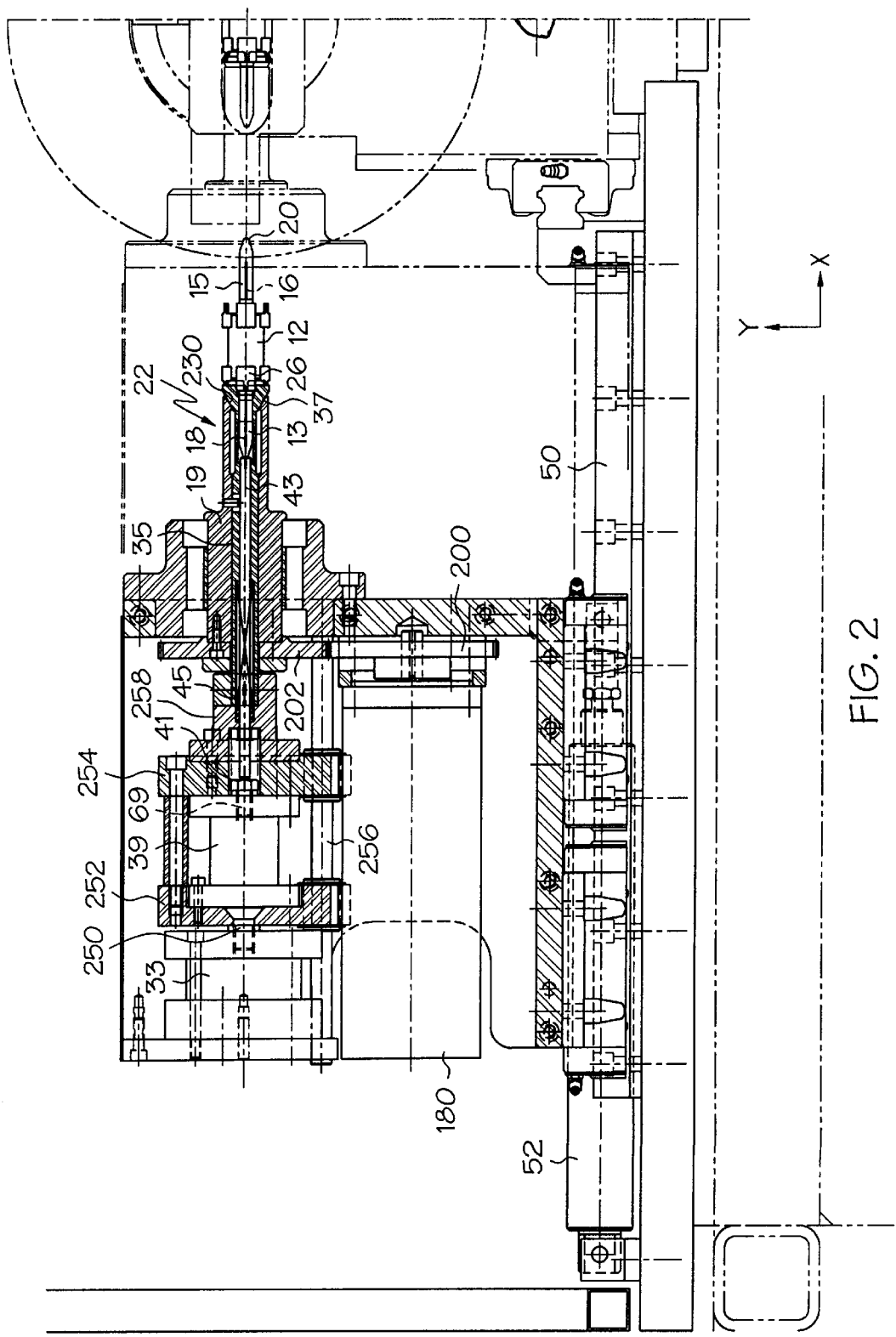
FIG. 2 is a side, cross section view of the loading assembly of the winder of the present invention taken along line 2—2 of FIG. 1B.
Figure 2A:
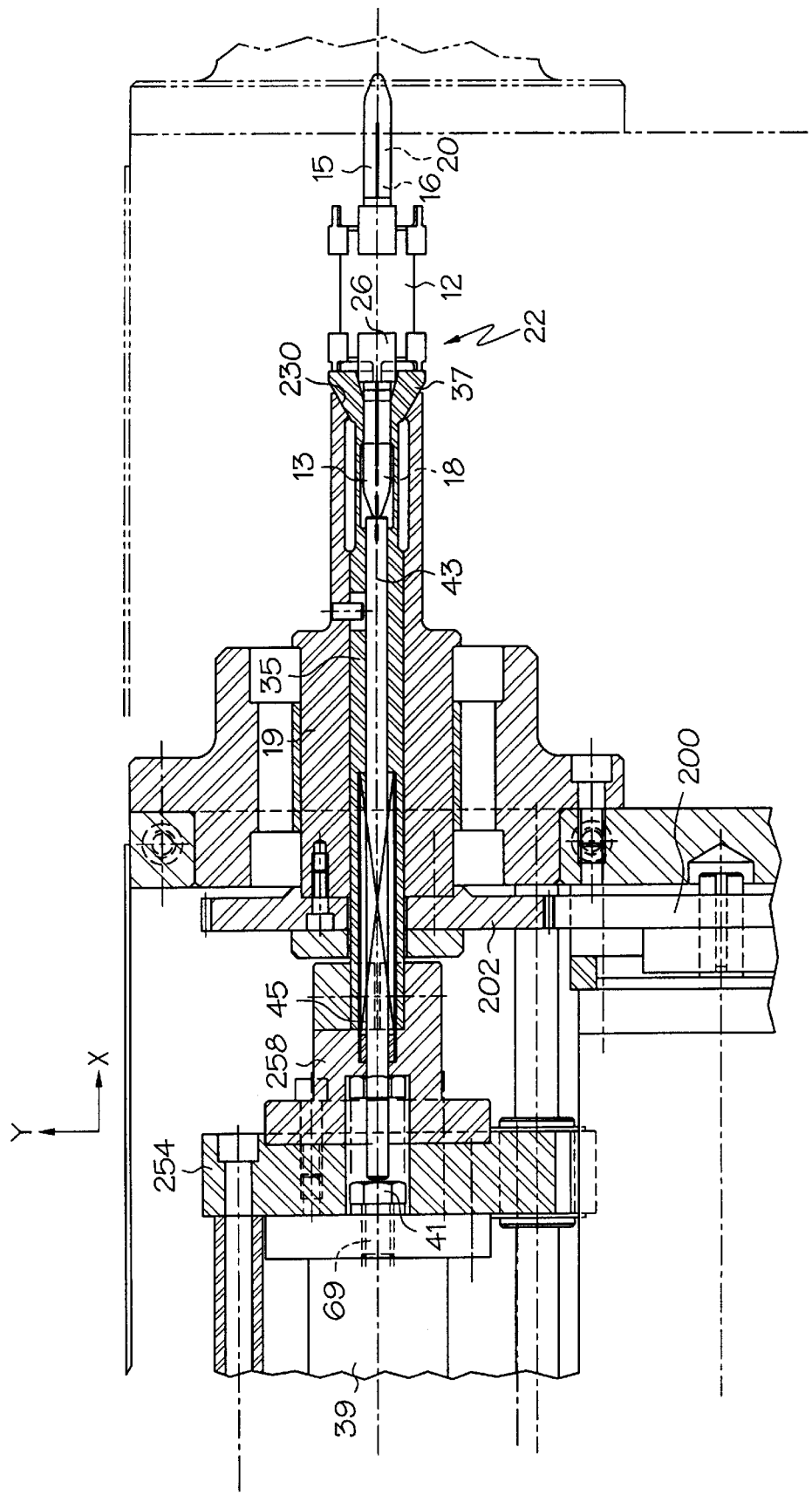
FIG. 2A is a detail view of the collet and stator core of FIG. 2.

The winder 10 of the present invention is used to wind a bundle of wires onto an stator core 12 (FIG. 1) that has a set of radially outwardly extending flanges 14. The stator core 12 includes an axially-extending shaft 16 having a first end 18 and a second end 20. The shaft 16 may be made of a magnetic material, and acts as an armature when the stator core 12 is wound with windings. A first shroud 13 is located on the first end 18 and a second shroud 15 is located on the second end 20 of the shaft 16 (FIG. 2A). The shrouds 13, 15 prevent a wire from catching on the end of the shaft 16 during winding operations. Each shroud 13, 15 is generally cylindrical, and includes a central cylindrical cut-out to receive the end of the shaft 16. Each shroud includes a generally "bullet" shaped head that forces a wire to one side or another of the shroud 13, 15 so that the wire does not get caught onto the end of the shaft 16 that is covered by the shroud. The shrouds 13, 15 can be slid over the end of the shaft 16 and are loosely held in place by friction.

For the winding operations discussed herein, the stator core 12 includes six radially spaced slots shown as slots 21, 23, 25, 27, 29, 31. In other words, the illustrated stator core 12 includes three pairs of 180° opposed slot pairs. However, the method and apparatus of the present invention may be modified to accommodate various different arrangements of slots on the stator core 12. Furthermore, the method and apparatus of the present invention may be used to wind armatures or other components of electric motors. For ease of illustration the invention will be shown and described in conjunction with stators, although the invention is not limited to use with stators.

Figure 1B:
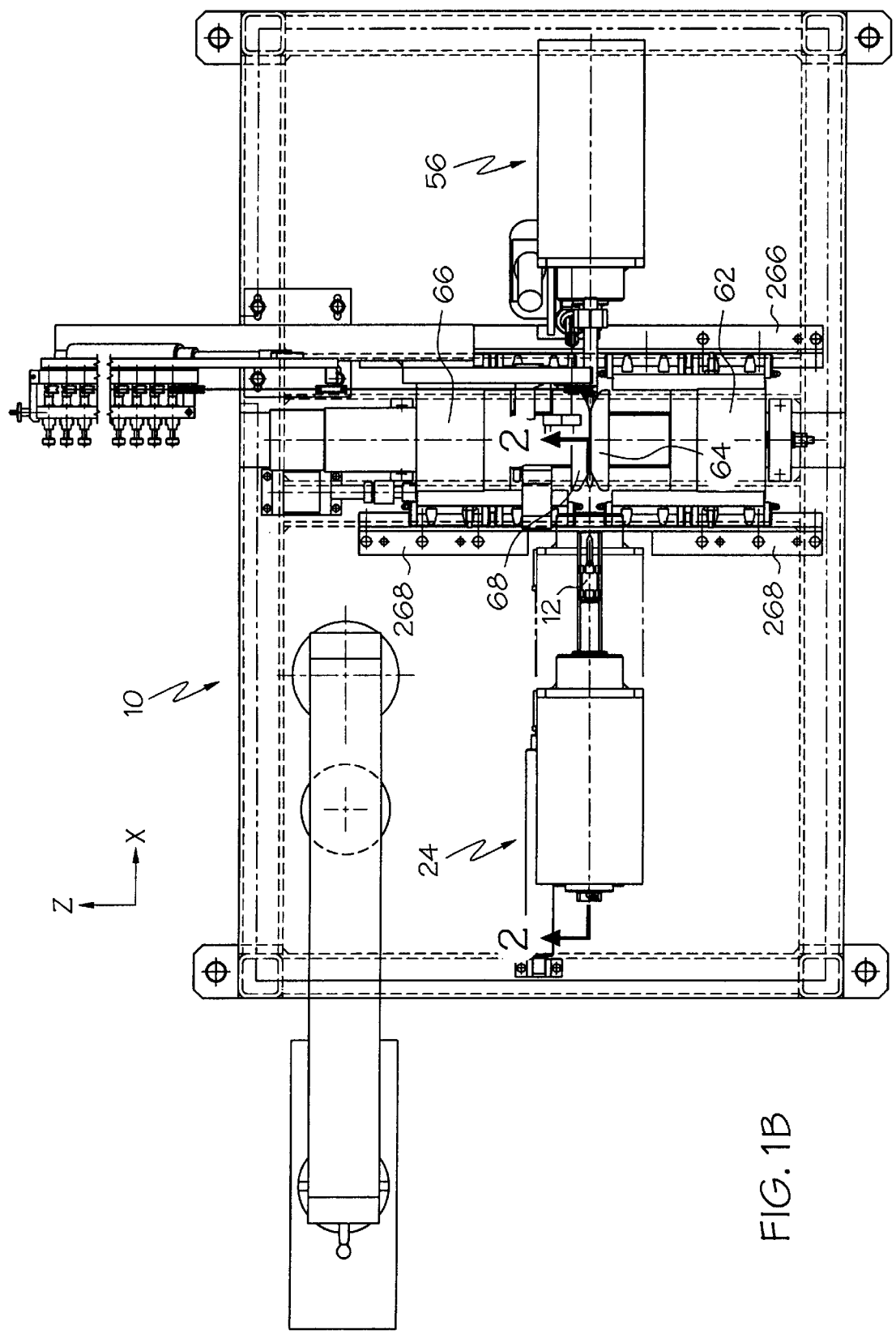
FIG. 1B is a top view of the winder of the present invention.
Figure 4:
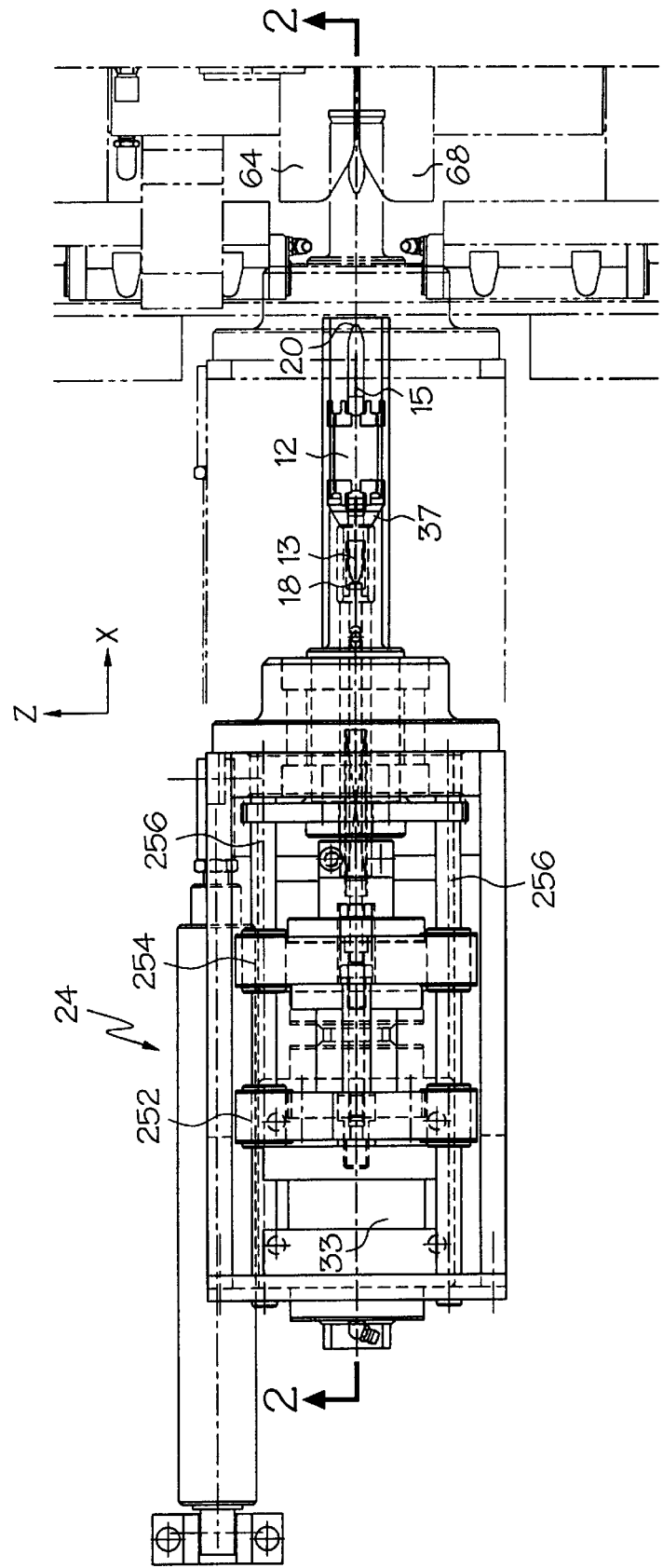
FIG. 4 is a top view of the loading assembly and stator core of FIG. 2.

The winding machine 10 is shown in FIG. 1B, and includes a loading assembly 24, a locator assembly 56, a primary tooling assembly 66 and a secondary tooling assembly 62. In order to commence winding operations, a stator core 12 is placed into a loading assembly 24 of the winding machine 10 (FIG. 2) (In FIGS. 2–43, the stator core 12 shown therein differs slightly from the shape of the stator core 12 shown in FIGS. 1 and 1A, although the same reference number is used). The first end 18 of the shaft 16 having the first shroud 13 thereon is inserted into a collet 22 of the loading assembly 24. In order to mount the stator core 12 into the collet 22, a locating tab 26 on the stator core 12 must be aligned with a slot (not shown) in the collet 22 such that the locating tab 26 is received in the slot. This ensures that the stator core 12 is located in a known radial position to ensure proper winding operations upon the stator core 12. Once the shaft 16 is received in the collet assembly 22, the operator holds the stator core 12 in place with one hand, while using the other hand to activate a start switch (not shown). When the start switch is activated, collet clamping cylinder 33 is triggered to move the draw bar 35 toward the collet clamping cylinder 33 (i.e. in the −X direction). The collet clamping cylinder 33 includes a shaft 250 that urges the blocks 252, 254, as well as the stripper cylinder 39 in the −X direction. The blocks 252, 254 are coupled to a pair of collet assembly slide bars 256 to guide the sliding motion of the blocks 252, 254 (FIG. 4).

Block 254 is coupled to the draw bar 35 by an intermediate block 258, and the draw bar 35 includes a collet mechanism 37 mounted on the end of the draw bar (FIG. 2A). The draw bar 35 and collet mechanism 37 are mounted inside a bearing spindle 19. The collet mechanism 37 is mounted inside a tapered open end 230 of the bearing spindle 19. Thus, when the collet clamping cylinder 33 moves the draw bar 35 in the −X direction, the collet mechanism 37 movies radially inwardly as guided by the tapered end 230 to grip the first shroud 13 mounted onto the shaft 16 of the stator core 12.

Once the stator core 12 is gripped in the loading assembly 24, the operator withdraws from the machine and activates a cycle start button (not shown) that activates the automatic winding operations. The servo positioning motor 180 (FIG. 2) is then activated to move the stator core 12 into the desired radial position. The rotation of the stator core 12 is achieved by a driver gear 200 that is attached to the servo positioning motor 180. The driver gear 200 drives a driven gear 202 that is in turn coupled to the bearing spindle 19. The bearing spindle 19 rotates about the X-axis when driven by the driven gear 202, and also rotates the collet 22 and stator core 12 that are captured inside the bearing spindle 19.

The winder 10 also includes a locator assembly 56 (FIG. 5) that includes a reciprocal stop locator 54. The stop locator 54 is extended to the position shown in hidden lines in FIG. 5 such that the stop locator 54 extends outwardly from the body of the locator assembly 56. The reciprocation of the locator 54 is driven by a locator cylinder 204 such that the stop locator 54 reciprocates within a spindle 126. The stop locator 54 ensures that the stator core 12 is located in the desired position along the X-axis when winding operations commence, as will be discussed below.

Figure 5:
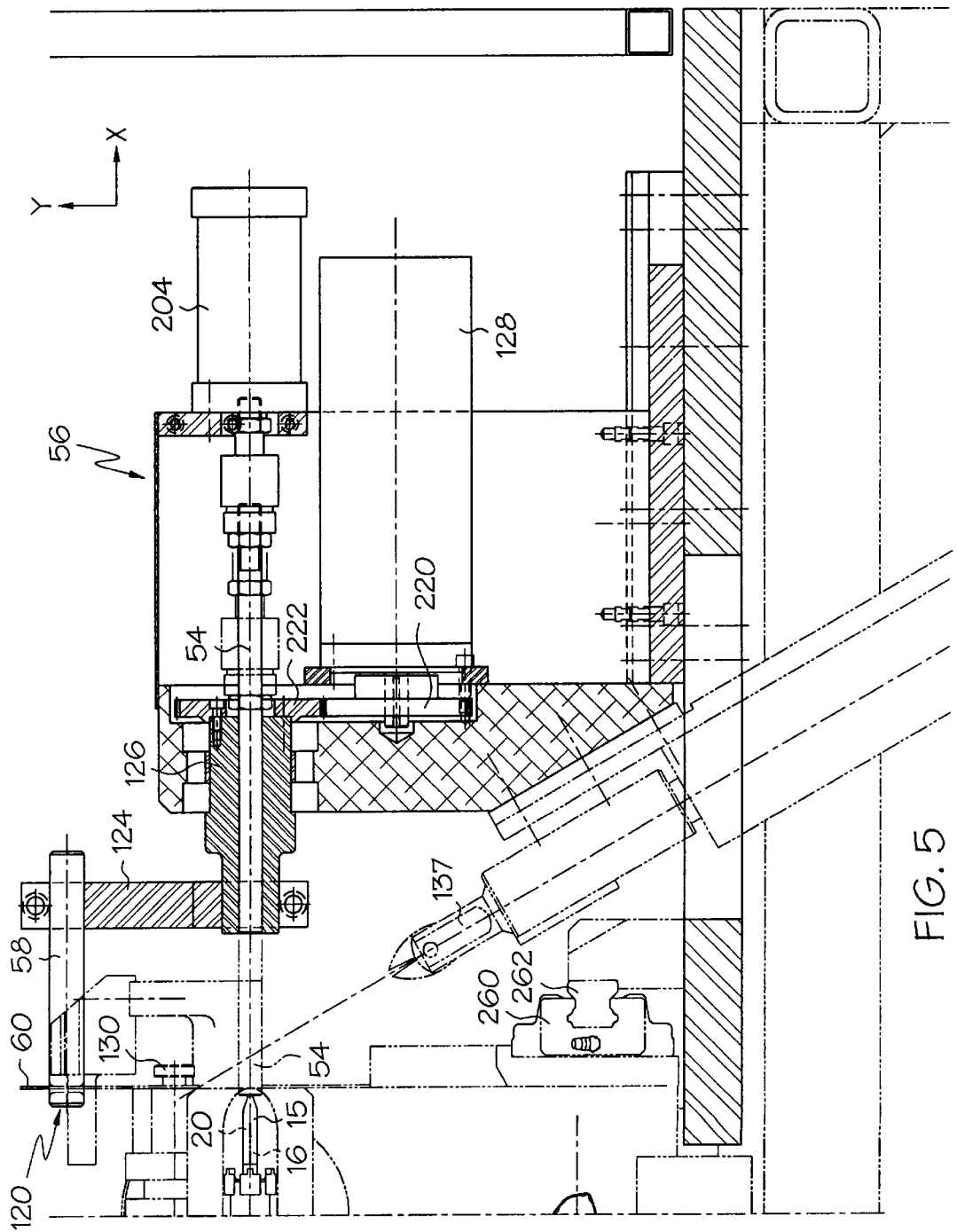
FIG. 5 is a side, cross section view of the locator assembly of the winder of the present invention.
Figure 6:
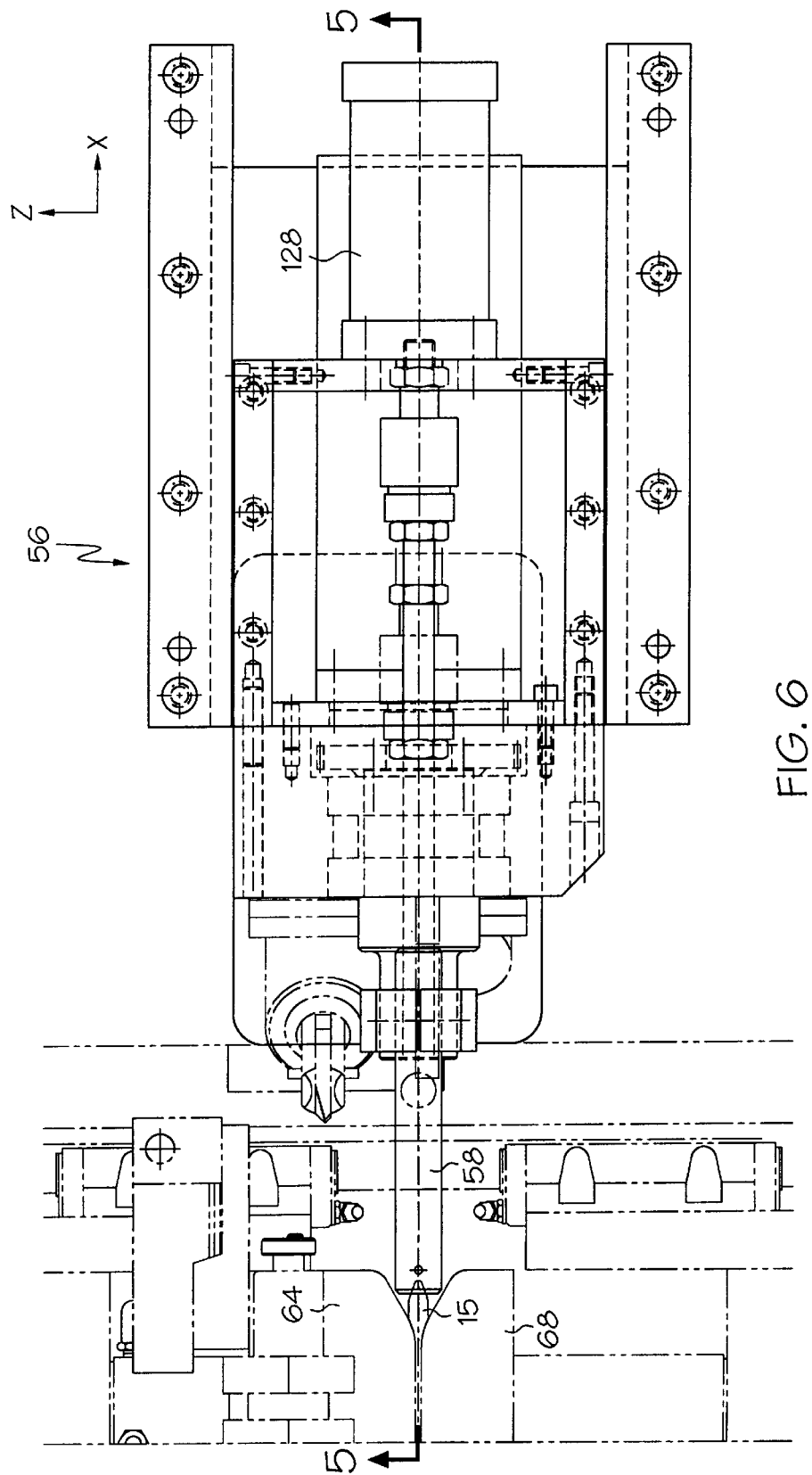
FIG. 6 is a top view of the locator assembly of FIG. 5.
Figure 7:
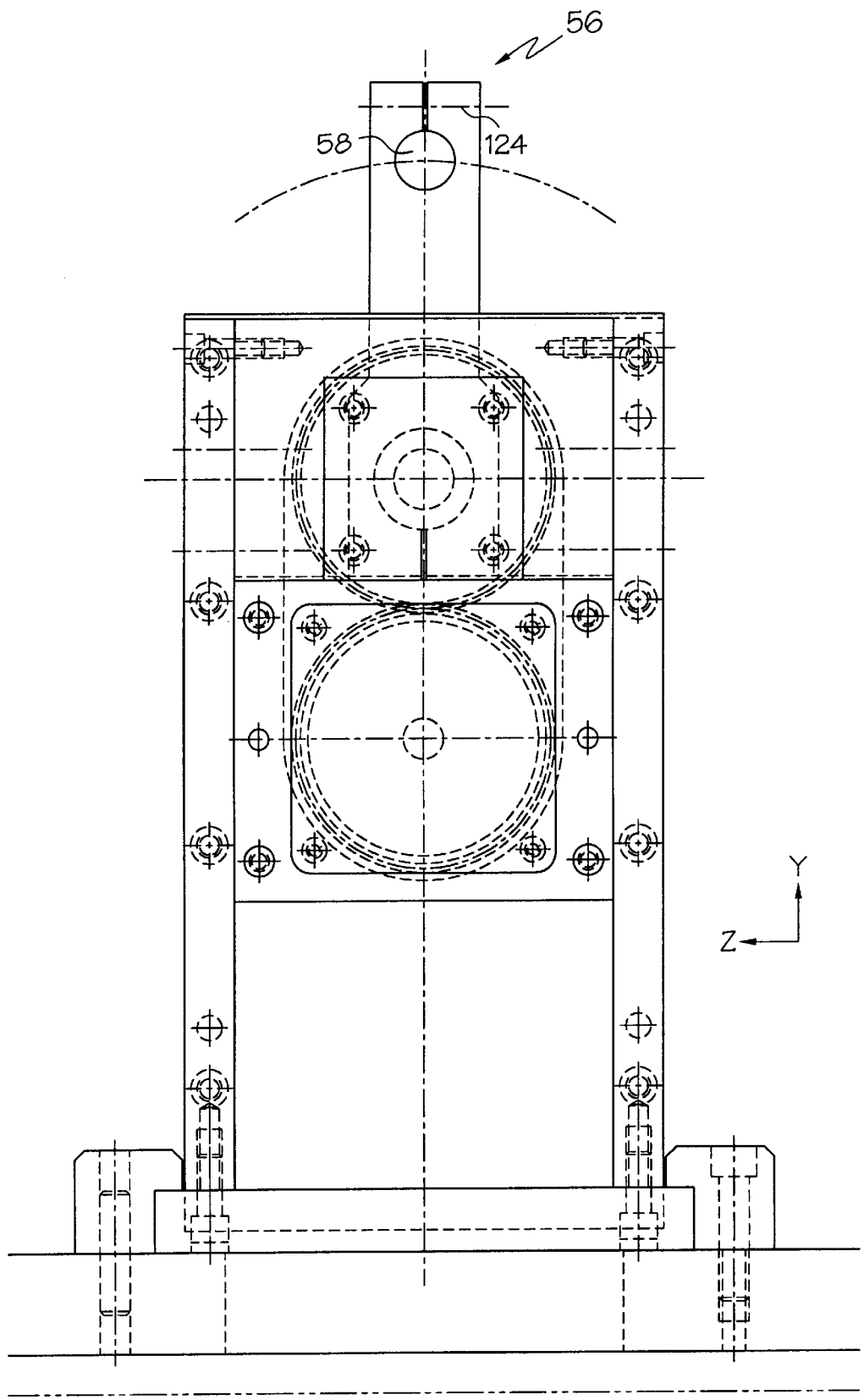
FIG. 7 is an end view of the locator assembly of FIG. 5.

Returning to FIG. 2, the loading assembly 24 is mounted on a rail 50 such that the loading assembly 24 can reciprocate along the X-axis. After the stator core 12 is located in the desired radial position and the stop locator 54 is extended, the loading assembly 24 moves in the +X direction as powered by the extension of the rail cylinder 52. The loading assembly 24 is retained and guided by the rail 50. The loading assembly 24 and stator core 12 move in the +X direction until the end shroud 15 on the stator core 12 engages the stop locator 54 on the locator assembly 56 (FIG. 5).

Figure 8A:
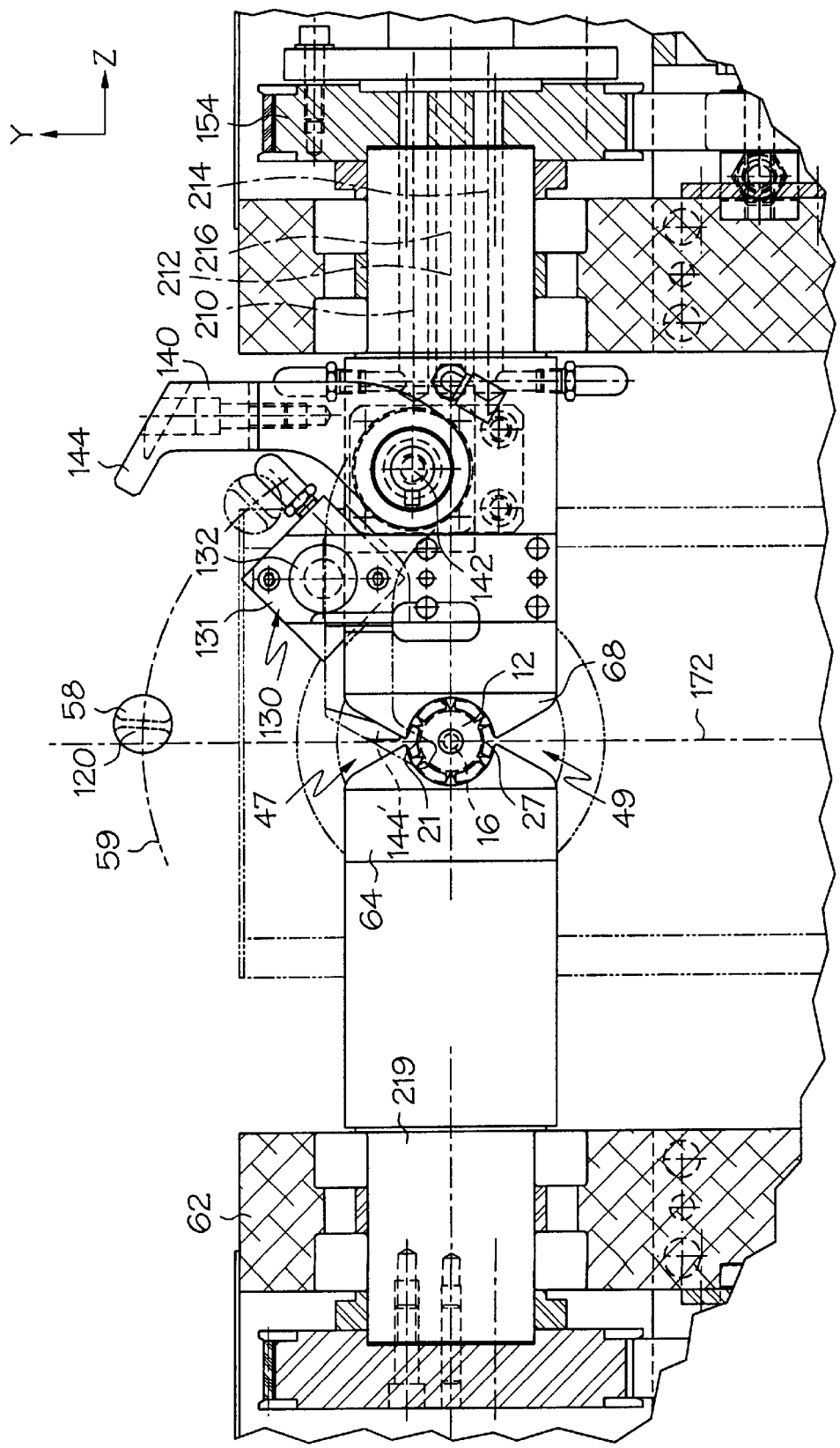
FIG. 8A is a detail of FIG. 8 showing the stator core and tooling assemblies.
Figure 8B:
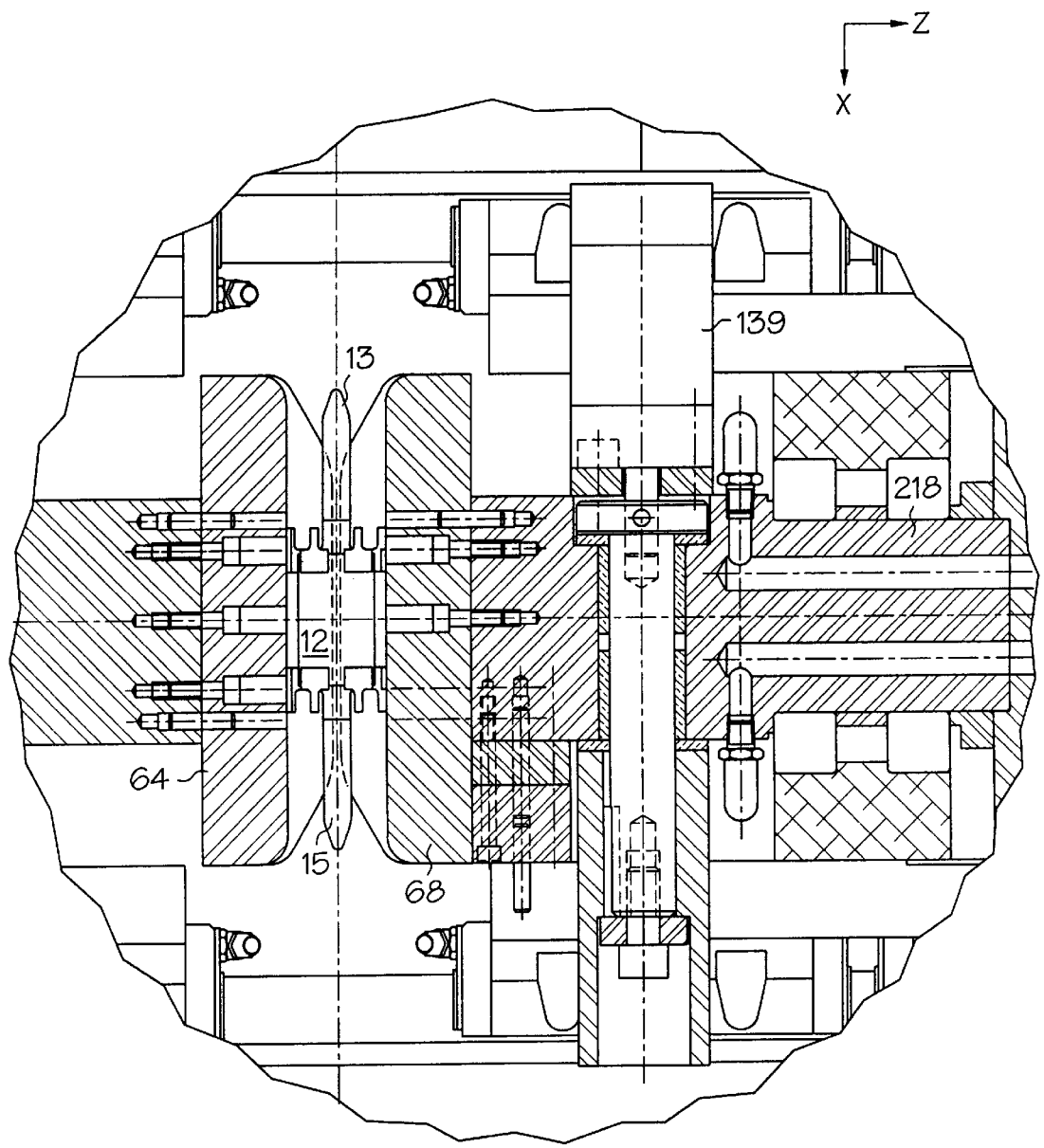
FIG. 8B is a detail cross section top view of part of the tooling assemblies of FIG. 8, taken along line 8B—8B of FIG. 8.

Once the stator core 12 is properly located and oriented, a pair of winding tools 64, 68 are then moved along the Z-axis to engage the stator core 12 at the flanges 14. As shown in FIG. 8 the winding machine 10 includes a secondary tooling assembly 62 that includes the secondary winding tool 64, and a primary tooling assembly 66 that includes the primary winding tool 68. Each tooling assembly 62, 66 is movable along the Z-axis. Thus, when the tooling assemblies 62, 66 move toward each other, they engage the stator core 12 between the curved jaws or engagement surface of each winding tools 64, 68. As best seen in FIG. 8A, when a properly oriented stator core 12 is captured between the winding tools 64, 68, it is located such that one of the slots (i.e. slot 21) of the stator core 12 is aligned with the upper gap 47 between the winding tools 64, 68 such that the slot 21 can receive a bundle of wires therein. Furthermore, another slot (such as slot 27) that is 180 degrees opposite of the slot 21 is aligned with the lower gap 49 between the winding tools 64, 68.

Returning to FIG. 8, the secondary tooling assembly 62 includes a secondary slide bar 70 that is slidably received through a stationary secondary block 72. Similarly, the primary tooling assembly 66 includes a primary slide bar 74 that is slidably received through a stationary primary block 76. The slide bars 70, 74 and blocks 72, 76 guide the relative movement of each tooling assembly 62, 66 along the Z-axis. A secondary open stop 80 and a secondary close stop 82 are mounted on the secondary slide bar 70 on either side of the secondary block 72, and the stops 80, 82 limit the travel of the secondary tooling assembly 62 relative to the secondary block 72. Similarly, the primary slide bar 74 includes a primary open stop 84 and a primary close stop 86 mounted on either side of the primary block 76 and the stops 84, 86 limit the motion of the primary tooling assembly 66 relative the primary block 76. The stops 80, 82, 84, 86 are preferably adjustably mounted onto the slide bars 70, 74 such that the range of motion of the slide bars 70, 74, and thereby the associated tooling assemblies 62, 66, may be adjusted.

When the tooling assemblies 62, 66 are in their open positions, they are each retracted such that their open stops 80, 84 hit the associated blocks 72, 76. That is, the secondary tooling assembly 62 is moved in the −Z direction until the secondary open stop 80 engages the secondary block 72, and the primary tooling assembly 66 is moved in the +Z direction until the primary open stop 84 engages the primary block 76. When in the open position, the tooling assemblies 62, 66 are positioned to receive the stator core 12 therebetween. After the stator core 12 is located between the tooling assemblies 62, 66, as positioned by the loading assembly 24, the tooling assemblies 62, 66 are triggered to move toward the stator core 12 to engage the stator core 12 between the winding tools 64, 68.

A double acting clamp cylinder 95 and air spring 90 are used to move the winding tools 64, 68 into and out of engagement with the stator core 12. The clamp cylinder 95 includes a piston 97 having a piston rod 92 that is coupled to the secondary tooling assembly 62 by a clevis 101. The outer casing 105 of the clamp cylinder 95 is coupled to the primary tooling assembly 66 by a clevis 93. The air spring 90 is coupled to the primary tooling assembly 66 and biases the primary tooling assembly 66 in the −Z direction.

In order to move the winding tools 64, 68 into position to engage the stator core 12, air is fed to the left hand side of the piston 97 in the clamp cylinder 95, and air is removed from the right hand side of the piston 97. The air pressure in the clamp cylinder 95 urges the piston 97 and outer casing 105 to move toward each other. However, because the outer casing 105 is biased in the −Z direction, the outer casing 105 (and therefore the primary tooling assembly 66) is moved in the −Z direction while the piston 97 (and therefore the secondary tooling assembly 62) is held stationary. Thus the primary tooling assembly 66 moves in the −Z direction until the primary close stop 86 engages the primary block 76 to limit the motion of the primary tooling assembly 66. When in the closed position, the jaws of the primary winding tool 68 preferably just touch the flanges 14 of the stator core 12. The primary winding tool 68 is shaped to just touch the stator core 12 when the stator core 12 is properly centered within the winding machine 10. If the stator core 12 is slightly off center in the +Z direction, the primary winding tool 68 will move the stator core 12 in the −Z direction until it is properly centered.

When the close stop 86 of the primary tooling assembly 66 engages the primary block 76 the outer casing 105 can no longer move in the −Z direction, and the piston 97 is then pulled in the +Z direction. Because the piston rod 92 is coupled to the secondary tooling assembly 62 by the clevis 101, the secondary tooling assembly 62 is shifted in the +Z direction. The secondary tooling assembly 62 moves in the +Z direction until the secondary winding tool 64 engages the stator core 12. The movement of the secondary winding tool 64 is halted when the secondary winding tool 64 engages the stator core 12. The secondary close stop 82 on the secondary tooling assembly 62 provides a safety feature to limit the travel of the secondary tooling assembly 62 in case the secondary tooling assembly 62 is triggered to move in the +Z direction when there is no stator core 12 in the winding machine 10. However, during normal operations the secondary winding tool 64 engages the stator core 12 before the secondary close stop 82 engages the secondary block 72. Thus in normal operation conditions there will be a slight gap between the secondary close stop 82 and the secondary block 72 when the secondary tooling assembly 62 engages the stator core 12. If the stator core 12 is slightly off center in the −Z direction, the secondary winding tool 64 will move the stator core 12 in the +Z direction until it is properly centered. FIG. 8 shows the tooling assemblies 62, 66 in their closed position wherein the stator body 12 is clamped between the winding tools 64, 68.

In order to enable maintenance or part replacement, the secondary block 72 and primary block 76 are removable from the secondary slide bar 70 and primary slide bar 74, respectively to enable the tooling assemblies 62, 66 to be rotated out-of-position about the Y-axis.

Figure 9:
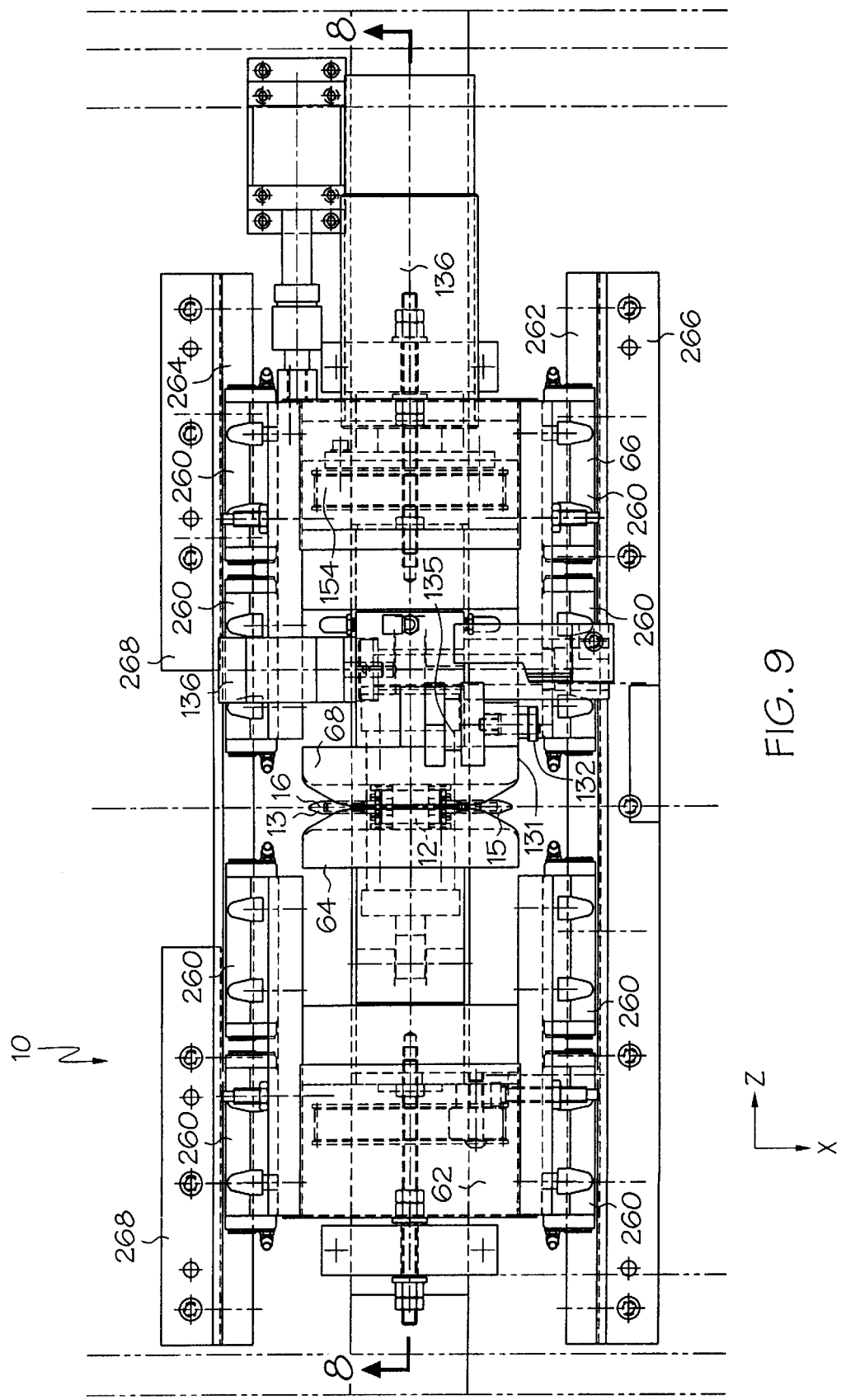
FIG. 9 is a top view of the tooling assemblies and stator core of FIG. 8.
Figure 10:
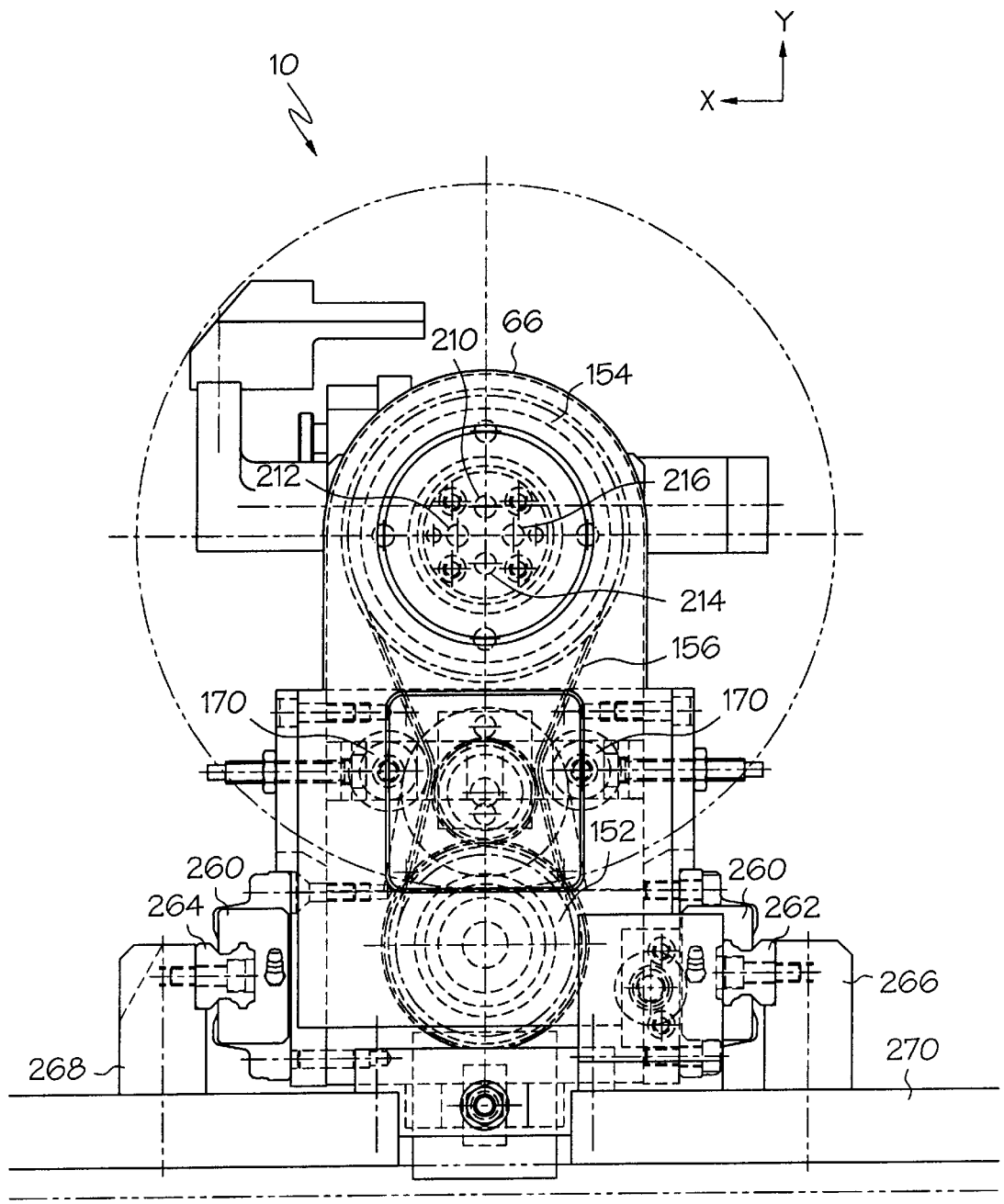
FIG. 10 is an end view of the tooling assemblies and stator core of FIG. 8.

The tooling assemblies 62, 66 each have a pair of slide saddles 260 mounted on either side of the tooling assemblies 62, 66 (FIG. 9). Each slide saddle 260 is mounted onto a slide rail 262, 264. As shown in FIG. 10, each slide rail 262, 264 is mounted to a stationary bar 266, 268, that is in turn mounted to a base plate 270. The slide rails 262, 264 are received in the slide saddles 260 to guide the sliding motion of the tooling assemblies 62, 66 along the Z-axis.

Once the stator core 12 is gripped between the tooling assemblies 62, 66, the collet assembly 22 releases the first shroud 13 located about the first end 18 of the shaft 16. In order to do this, the stripper cylinder 39 is activated (FIG. 2A). The stripper cylinder 39 includes a shaft 69 having a driving nut 41 at one end. The shaft 69 and driving nut 41 are moved forwardly (in the +X direction) until the driving nut 41 engages the stripper bar 43 and drives the stripper bar 43 forwardly. The forward movement of the stripper bar 43 compresses the spring 45 located around the stripper bar 43. As it moves forward, the stripper bar 43 engages the end of the first shroud 13 and puts pressure on the first shroud 13.

The pressure in the rail cylinder 52 is then. released to allow the loading assembly 24 to move in the −X direction, as will be apparent below. Next, the collet clamping cylinder 33 (FIG. 2) is activated to move the draw bar 35 in the +X direction. This causes the collet mechanism 37 to move radially outwardly and release its grip on the stator core 12.

Figure 2B:
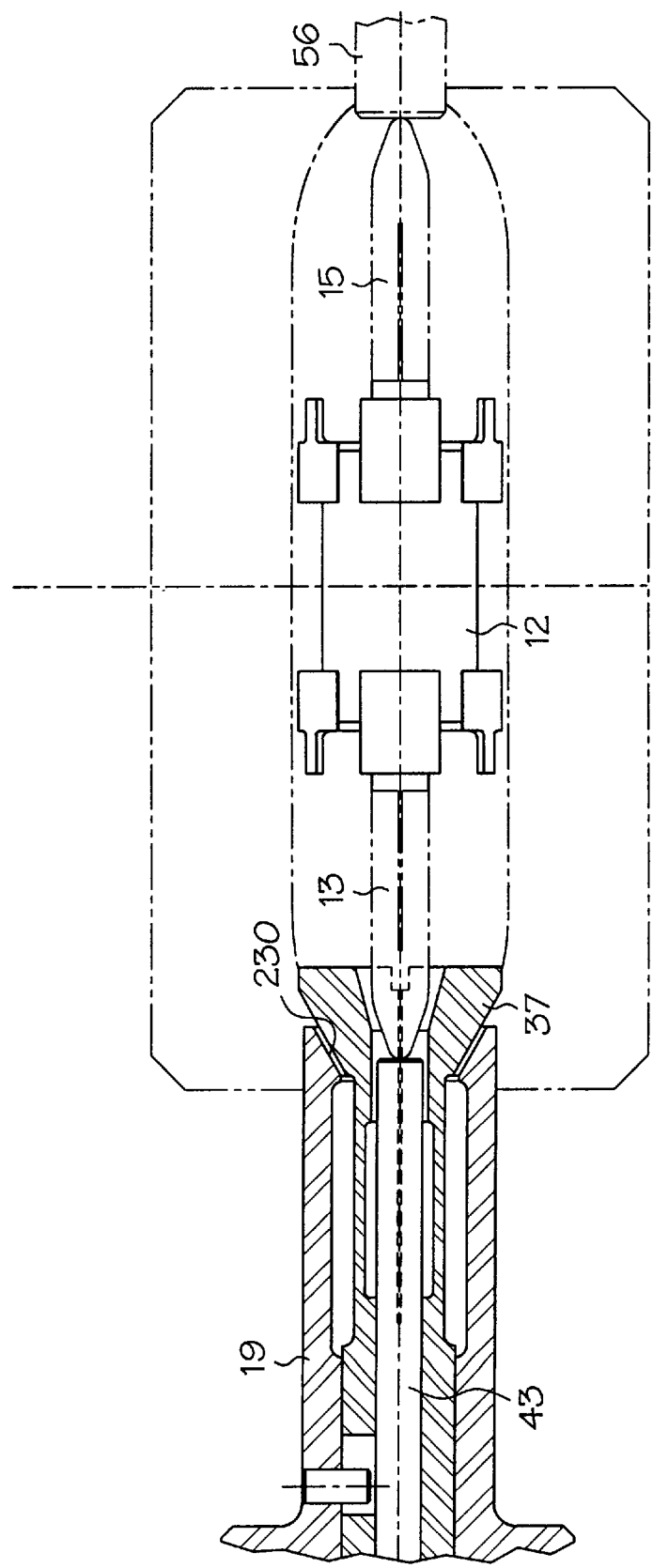
FIG. 2B is a detail view of the collet and stator core of FIG. 2, showing the stripper bar in its extended position.
Figure 3:
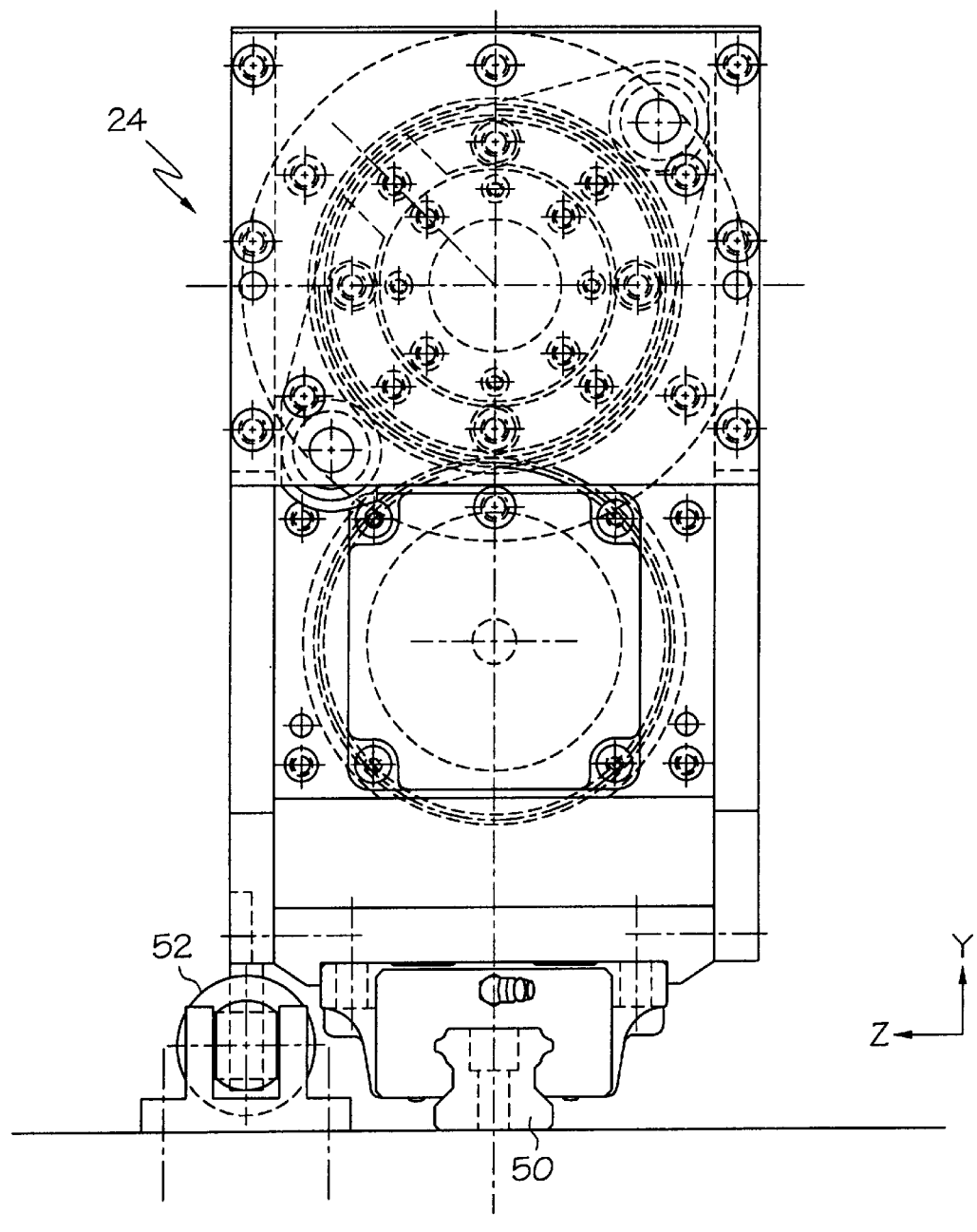
FIG. 3 is an end view of the loading assembly of FIG. 2.

During this time the stripper cylinder 39 continues to push the stripper bar 43 against the first shroud 13. Thus, once the collet mechanism 37 releases its grip on the stator core 12, the force of the stripper bar 43 pushing against the first shroud 13 causes the loading assembly 24 to be pushed away from the stator core 12 along the rail 50. In this manner the stripper bar 43 and stripper cylinder 39 push the loading assembly 24 in the −X direction along the rail 50 as the driving nut 41 continues to move away from the stripper cylinder 39. The stripper cylinder 39 continues to push the driving nut 41 and stripper bar in the +X direction relative the draw bar 35, which forces the shroud 13 and stator core 12 out of the collet 22. The stripper cylinder continues to push the driving nut 41 and stripper bar 43 until the right hand end of the stripper bar 43 is about flush with the right hand end of the collet mechanism 37 as shown in FIG. 2B. At this point, the loading assembly 24 is fully disengaged from the stator core 12, and the stator core is held in place by the winding tools 64, 68.

After the loading assembly 24 is disengaged from the stator core 12, the loading assembly 24 is moved in the −X direction to its original starting position by the rail cylinder 52. The stripper cylinder 39 then retracts its shaft 69 and driving nut 41, and the stripper bar 43 returns to its original position as biased by spring 45. The stop locator 54 is then retracted as powered by the locator cylinder 204 (FIG. 5). This allows clearance for rotation of the stator core 12 and the winding tools 64, 68. Next, a bundle of wires is then fed into the stator core 12 as will be discussed below.

As shown in FIG. 11, a plurality of wire supplies (not shown) each supply an unbundled wire 100. Each wire 100 is fed through a wire wheel 102 and through a pair of opposed spring loaded felt pads 104 that clean the wire 100 as it is passed over between the pads 104. Each wire 100 then passes through a bar 106 with an eyelet for each wire 100 to pass through. After exiting through the bar 106, each wire 100 is fed through a pair of opposed spring loaded carbide pads 108 that squeeze the wire as the wire is passed through the pads to provide tension to the wire 100. Each wire 100 is then passed over a roller 110 to a single wrap-around roller 112. The wires 100 are combined into a wire bundle 60 at the wrap-around roller 112. The wire bundle 60 is then fed past a dancer roller 114 and redirecting roller 116, and then fed to the wire guide 58. The dancer roller 114 is coupled to a pivotable arm 117 which is in turn coupled to a pivotable cylinder 118. In this manner, the dancer assembly accommodates changes of tension in the wire bundle 60 in a commonly known manner. Although the invention is described as being used in conjunction with a wire bundle, it should be understood that a single wire may be used in place of the wire bundle without departing from the scope of the invention.

Figure 12:
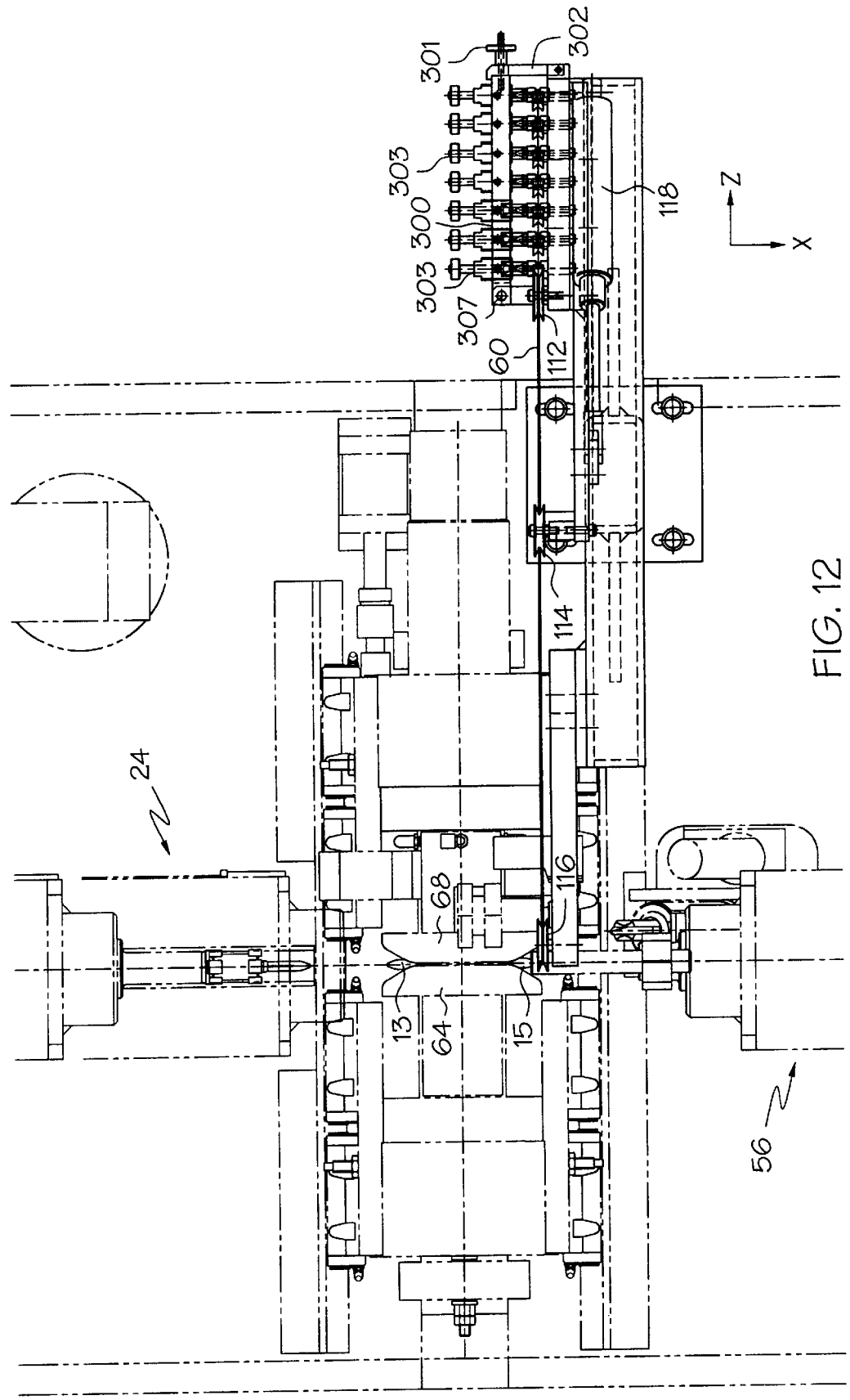
FIG. 12 is a top view of the tooling assemblies, stator core and wire feed mechanism of FIG. 11.

One pad of each of the pair of felt pads 104 and one pad of the each of the pair of carbide pads 108 are mounted on a door 300. In order to provide access to the wires 100 inside of the door 300, the door 300 can be opened along its hinges 307 by threading a threaded knob 301 away from the door 300 (FIG. 12). This enables the retainer switch 302 to open, which releases the door 300 and enables it to swing open. When the door 300 is opened, one pad of each of the sets of pads 104, 108 is pulled away from its respective wire 100, and the tension in each wire is thereby released. Each of the wires 100 is passed through an eyelet in a bar 106, which keeps the wires 100 centered and in the proper position relative each pad set 104, 108 when the tension in each wire 100 is removed. When the door 300 is closed, the spring pressure in each pair of carbide pads 108 is maintained by threaded insert 303 that is screwed into the door 300. The pressure applied by the threaded insert 303 can be adjusted by rotating the threaded insert 303 to increase or decease the spring pressure. Another set of threaded inserts (not shown) are located below the inserts 303 to apply spring pressure to the felt pads 104 when the door 300 is closed.

Returning to FIG. 8A, the winding machine 10 includes a wire guide 58. In one embodiment the wire guide 58 is a generally a cylindrical body having a slot 120 at one end. Alternately, the body 120 may have a hole through which the wire bundle 60 is passed. The wire guide 58 is preferably made of a ceramic-coated metal, and is movable along the path 59 as shown in FIG. 8A. As best shown in FIG. 5, the wire guide 58 is coupled to a wire guide arm 124 that is coupled to a spindle 126 and a wire guide servo motor 128. The wire guide servo motor 128 includes an output gear 220 that meshes with a driven gear 222 that is coupled to the spindle 126. In this manner the wire guide 58 is pivotable about the axial center of the spindle 126 (which is coaxial with the center shaft 16 of the stator core 12) as controlled by the wire guide servo motor 128. The wire guide arm 124 is preferably removably clamped onto the spindle 126 by a split clamp or other means.

As best shown in FIG. 8A, the winding machine 10 also includes a wire clamp 130 that can clamp the wire bundle 60. The wire clamp 130 includes a round clamp head 132 mounted on the end of a clamp shaft 157. That clamp shaft 157 and clamp head 132 are reciprocal in the X-direction such that the clamp head 132 that can trap the wire bundle 60 between the head 132 of the wire clamp 130 and a stationary block 131 (FIG. 9). The reciprocation of the clamp shaft 157 and wire clamp head 132 in the X-direction is driven by a wire clamp cylinder 135.

As shown in FIG. 8A, the winding apparatus 10 also includes a wire guide rail 140 that is pivotable about its central shaft 142. The wire guide rail 140 is shown in FIG. 8A in its retracted position, and the head 144 of the wire guide rail 140 is shown in its engaged position in hidden lines as head 144' in FIG. 8A. The wire guide rail 140 is also shown in its engaged position in FIG. 15. The rotation of the wire guide rail 140 about the X-axis is powered by a four passage rotary union 136 that feeds air to and away from the rotary actuator 139 (FIG. 8). The rotary union 136 directs air pressure through four passages 210, 212, 214, 216 that are formed in the primary tooling assembly shaft 218 (also shown in FIG. 10). The outer casing of the rotary union 136 is not rotatable, but the inner passages are rotatable about the Z-axis so that air can be supplied from the rotary union 136 to the wire guide rail 140 when the wire guide rail 140 and primary tooling assembly shaft 218 are rotated about the Z-axis. The rotary union 136 is also coupled to the wire clamp cylinder 135 to driver the movement of the wire clamp 130.

During winding operations, the wire guide 58 preferably resides in one of three positions: (1) the "first position", which is slightly to the right of the vertical center line 172 of the stator core 12 (shown in FIG. 14 ); (2) the "second position" wherein the wire guide 58 is located slightly to the left of the vertical center line 172 of the stator core 12 (shown in FIG. 20); and (3) the "clamp position", wherein the wire guide 58 is located significantly to the right of the vertical center line 172 of the stator core 12 such that the wire guide 58 is located adjacent the wire clamp 130 (shown in FIG. 13). In one embodiment, the wire guide 58 is located about 8 degrees away from the center line 172 when the wire guide 58 is in the first or second position, and the wire guide is located about 49 degrees away from the center line 172 when in the clamp position. As noted earlier, the movement of the wire guide 58 is provided by the wire guide servo motor 128. The wire guide 58 is located relatively close to the stator core 12, and therefore the wire guide 58 provides the ability to quickly and efficiently move the wire bundle 60 between various positions with minimal movement of the wire guide 58. Furthermore, the relatively short distance between the wire guide 58 and stator core 12 minimizes distortion or deformation of the segment of the wire bundle 60 that is located between the wire guide 58 and stator core 12. The wire guide 58 can also quickly and easily move the wire bundle 60 into a position where it can be clamped by the wire clamp 130.

Referring to FIG. 8, the tooling server motor 150 drives the rotation of the winding tools 64, 68 about the Z-axis. The tooling servo motor 150 drives an output gear 151 that meshes with a driven gear 153. The driven gear 153 is coupled to a spline shaft 162. The spline shaft 162 is received in fixed radial bearings 224 at its right end, and a linear and rotary bearing pack 226 at its left end. A lower primary pulley 152 is coupled to the spline shaft 162, and the rotation of the lower primary pulley is coupled to an upper primary pulley 154 by a primary belt 156. The upper primary pulley 154 is directly coupled to a primary tooling assembly shaft 218, which is coupled to the primary winding tool 68. In this manner the tooling servo motor 150 drives the rotation of the primary winding tool 68 about the Z-axis.

At the left end of the spline shaft 162, the shaft 162 is rotationally coupled to a secondary lower pulley 160 that is attached to the linear and rotary bearing pack 226. The secondary lower pulley 160 is coupled to the secondary upper pulley 163 by a secondary belt 164. The secondary upper pulley 163 is coupled to the secondary tooling assembly shaft 219, which is coupled to the secondary winding tool 64. In this manner the tooling servo motor 150 drives the rotation of the secondary winding tool 64 about the Z-axis. The linear and rotary bearing pack 226 allows the spline shaft 162 to slide through the pack 226 while still maintaining the rotation of the secondary winding tool 64 and the primary winding tool 68.

In this manner, the servo motor 150 drives the rotation of the secondary winding tool 64 and the primary winding tool 68, and the rotation of the winding tools 64, 68 is coordinated. As shown in FIG. 10, the primary belt 156 is tensioned by a pair of tensioners 170. Similarly, the secondary belt 166 is also tensioned by a pair of tensioners 170 (FIG. 10A). Before beginning operation, the operator may wish to ensure that the secondary winding tool 64 is properly aligned with the primary winding tool 68. If the winding tools are not aligned, they can be individually rotated about the Z-axis as described below to bring them into alignment.

The radial position of the primary winding tool 68 may be adjusted by shifting the tensioners 170 to the left or the right while maintaining the spacing between the tensioners 170. For example, if it is desired to rotated the primary winding tool 68 counterclockwise in FIG. 10, both tensioners 170 on the primary belt 156 are then adjusted to the right (i.e. moved in the +X direction). This movement of the tensioners 170 pulls the primary belt 156 over the upper primary pulley 154 in a counterclockwise direction and causes the upper primary pulley 154 to rotate counterclockwise.

Because the primary winding tool 68 is coupled to the upper primary pulley 154, the primary winding tool 68 is also rotated counterclockwise. The lower primary pulley 152 remains locked in placed as the upper primary pulley 154 is adjusted. The tensioners 170 are then locked into position once the primary winding tool 68 is located in the desired radial orientation. Similar alignment procedures may be carried out on the secondary belt 166 and secondary winding tool 64.

The sequence of winding operations will now be discussed in greater detail. For the winding operations discussed herein, the stator core 12 includes six radially spaced slots shown as slots 21, 23, 25, 27, 29, 31 in FIG. 1. In other words, the illustrated stator core 12 includes three pairs of 180° opposed slot pairs (slot pairs 21 and 27, 23 and 29, and 25 and 31). However, the method and apparatus of the present invention may be modified to accommodate various different arrangements of slots on the stator core 12, or to wind other components, including components of electric motors or other devices. Furthermore, the order of operations disclosed herein is only one preferred embodiment of the invention, and it is to be understood that the steps can be carried out in a different order to achieve the same results. Furthermore, many of the steps described herein are preferred but not essential steps, and the method of the present invention need not include each step detailed herein.

Figure 16:
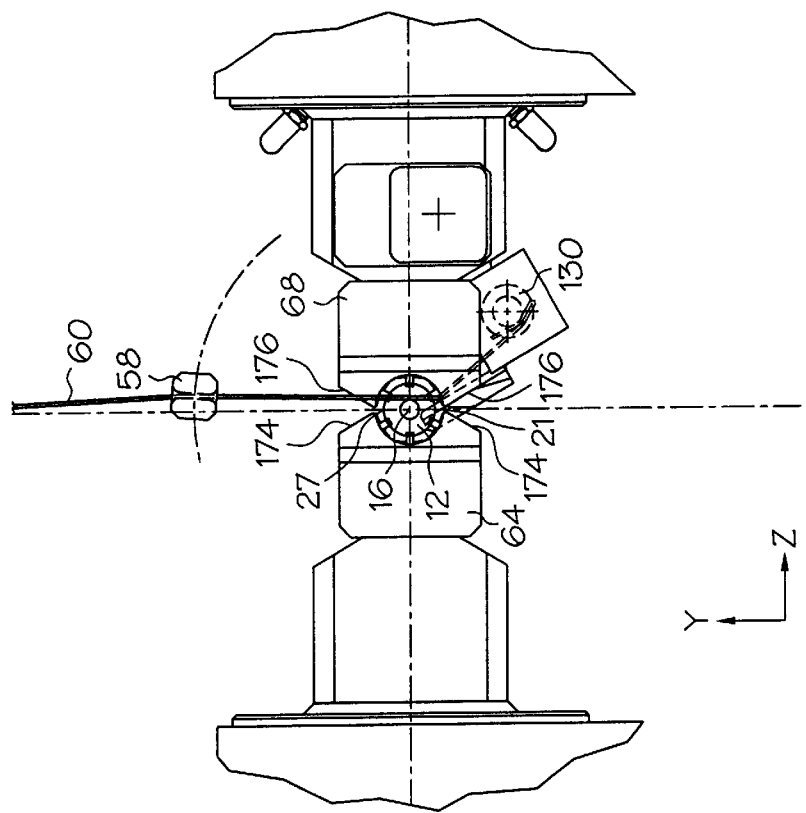

As shown in FIG. 13, when the winding operations commence, the secondary and primary winding tools 64, 68 engage either side of the stator core 12. Furthermore, the wire clamp 130 is in the clamped position such that the wire bundle 60 is trapped between the clamp head 132 and the stationary block 131. The wire bundle 60 is passed through the slot 120 in the wire guide 58, and the wire guide 58 is located in the clamp position. In order to begin winding operations, the wire guide 58 moves from the clamp position to the first position, as shown in FIG. 14. In the illustrated embodiment, when the wire guide 58 is in the first position it is approximately 8° to the right of the vertical center 172 of the stator core 12. The wire bundle 60 remains clamped between the clamp head 132 and the stationary block 131 when the wire guide 58 moves to the first position. The stator core 12 is oriented such that the first slot 21 is aligned with the upper gap 47 between the winding tools 64, 68. Furthermore, the fourth slot 27 is aligned with the lower gap 49 between the winding tools 64, 68. As shown in FIG. 16, the winding tools 64, 68 are shaped such that when they engage the stator core 12, the angled, guiding portions 174, 176 of the winding tools 64, 68 are each angled towards the respective slot of the stator core 12 that is located between the tools 64, 68. The angled portions 174, 176 help to guide the wire bundle 60 into the slot.

Figure 15:
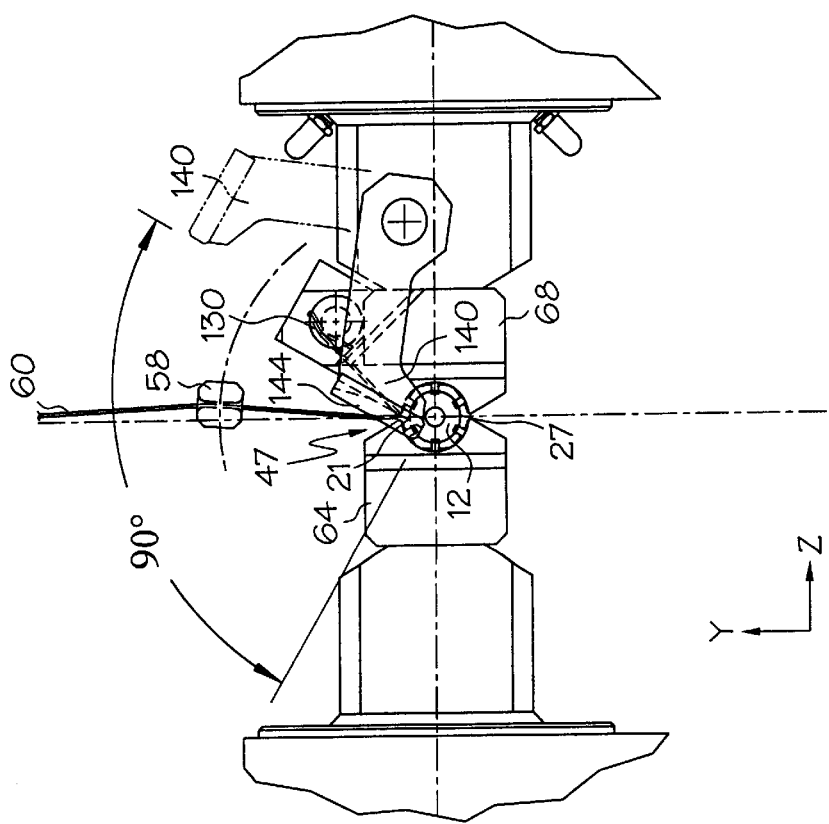

Next, as shown in FIG. 15, the wire guide rail 140 pivots from the disengaged position to the engaged position, thereby urging the wire bundle 60 into the upper gap 47 between the winding tools 64, 68. As noted earlier, the wire guide rail 140 pivots about shaft 142 and is driven by air from the rotary union 136. In this position, the wire bundle 60 is aligned with the first slot 21 and is ready to be urged into the slot 21.

Next, the winding tools 64, 68, tooling assembly shafts 218, 219, wire clamp 130, wire guide rail 140, and the stator core 12 gripped between the winding tools 64, 68, are all rotated 180° about the Z-axis. The rotation of the winding tools 64, 68 is driven by the servo motor 150, as discussed earlier and shown in FIG. 8. In this manner, the stator core 12 is rotated end-to-end. During this rotation, the wire bundle 60 is pulled into the first slot 21 of the stator core 12.

The position of the stator core 12, winding tools 64, 68, wire clamp 130, and wire guide rail 140 after the 180° rotation about the Z-axis is shown in FIG. 16. During the 180° rotation, the wire bundle 60 moves under the primary winding tool 68, such that the wire bundle 60 is effectively trapped underneath the winding tool 68. Also during the 180° rotation, the individual wires 100 are pulled off of their wire sources, and the wire bundle 60 is similarly pulled over the wrap-around roller 112, dancer 114, and re-directing roller 116 (FIG. 11). As shown in FIG. 16, the wound wire bundle is located to the right of the shaft 16 of the stator core 12.

Figure 17:
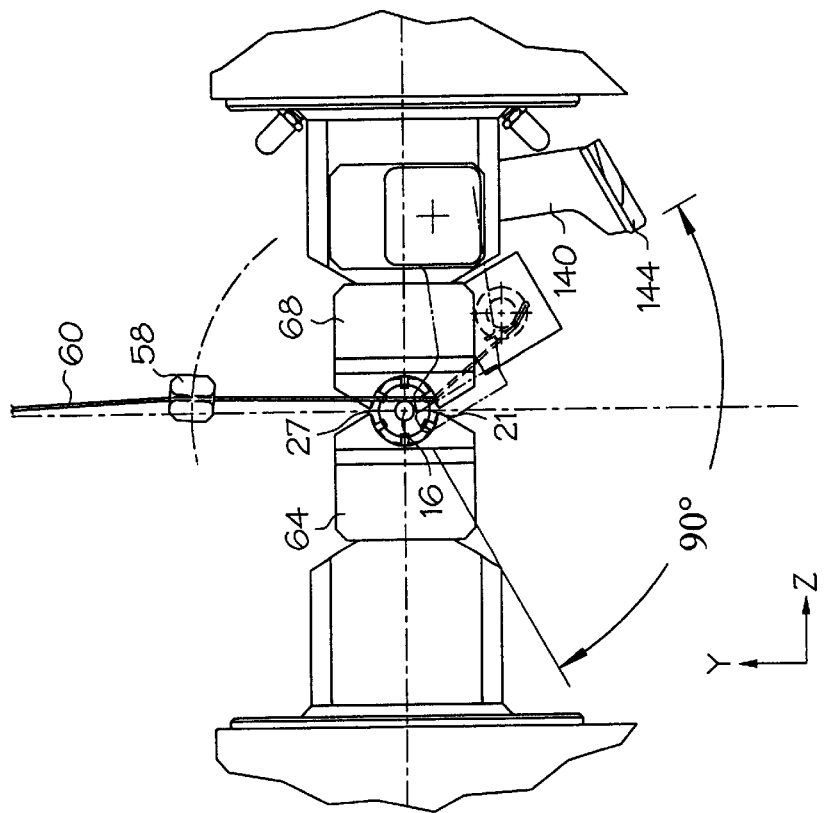

Next, the wire guide rail 140 is moved to its retracted position. The wire guide rail 140 is no longer needed as the wire bundle 60 is trapped underneath the tip of the primary winding tool 68. This position of the winding apparatus after the wire guide rail 140 is retracted is illustrated in FIG. 17. The wire guide rail 140 is coupled to the primary winding tool 68, and thereby rotates about the Z-axis with the stator core 12. Thus, the wire guide rail 140 can be engaged or disengaged at any point during the rotation of the stator core to control the position of the wire bundle 60. Furthermore, the wire clamp 130 also rotates about the Z-axis along with the stator core 12. This enables the wire clamp 130 to operate at any time during the winding operations to control the clamping of the wire bundle.

Figure 18:
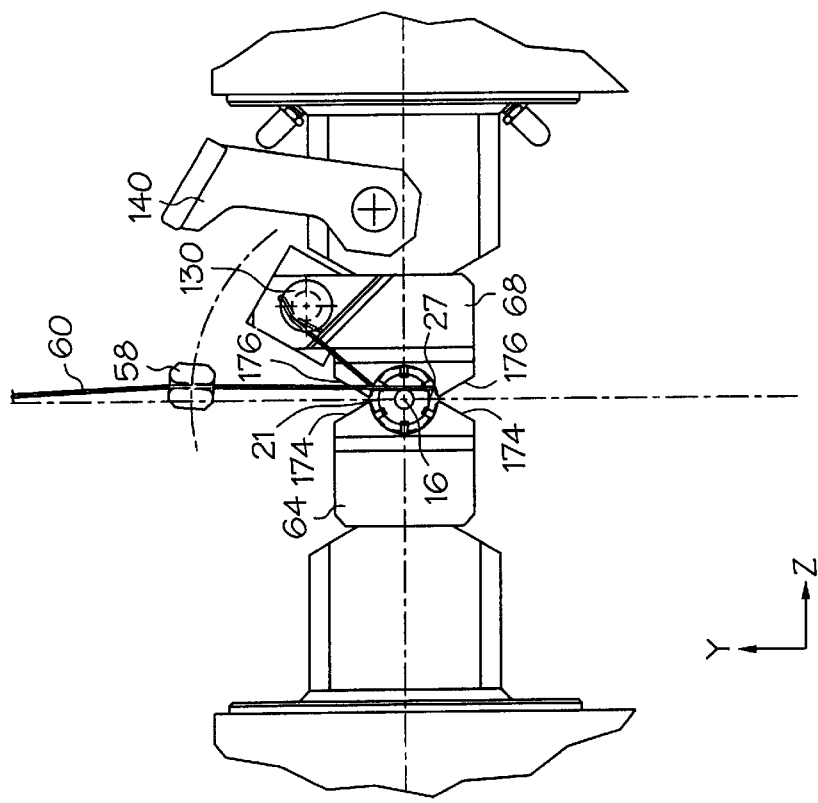

Moving to FIG. 18, the winding tools 64, 68 and stator core 12 are then rotated 180° about the Z-axis in the same direction as the previous rotation. This returns the winding tools 64, 68 and stator core 12 to their starting orientation, and winds the wire bundle into the first slot 21 and fourth slot 27 that is 180° opposite of the first slot 21. Again, however, the wound bundle remains on the right side of the center shaft 16.

At this point, the winding tools 64, 68 and stator core 12 are rotated as many times about the Z-axis as is desired to locate wire bundles in the first 21 and fourth slots 27 on the right hand side of the center shaft 16. The consecutive rotations of the stator core are not shown in the drawings. This winding operation winds the windings 310 shown in FIG. 1A.

Figure 20:
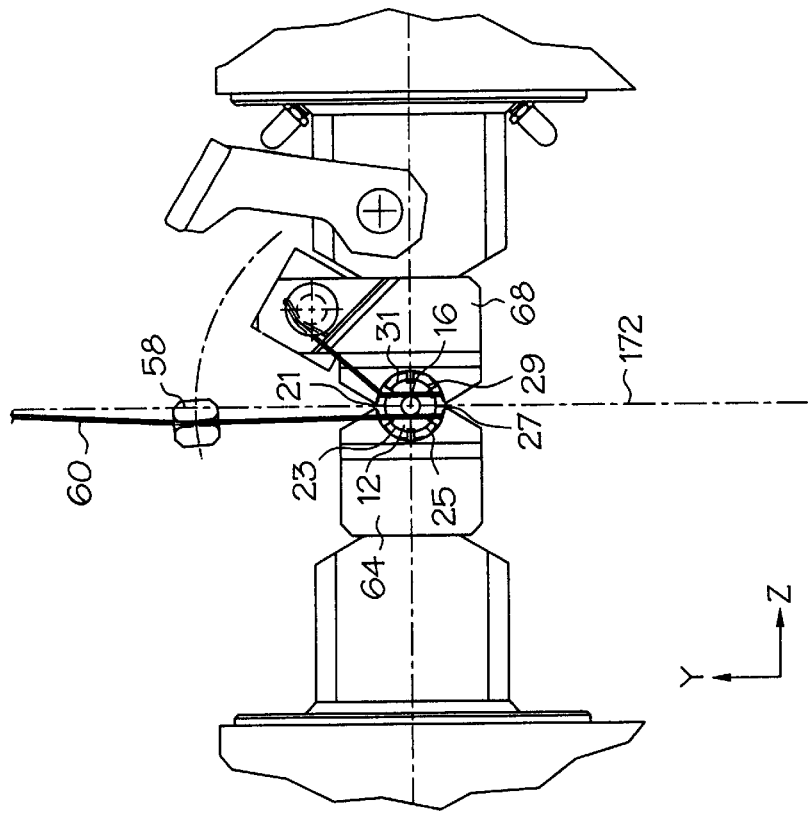
Figure 19:
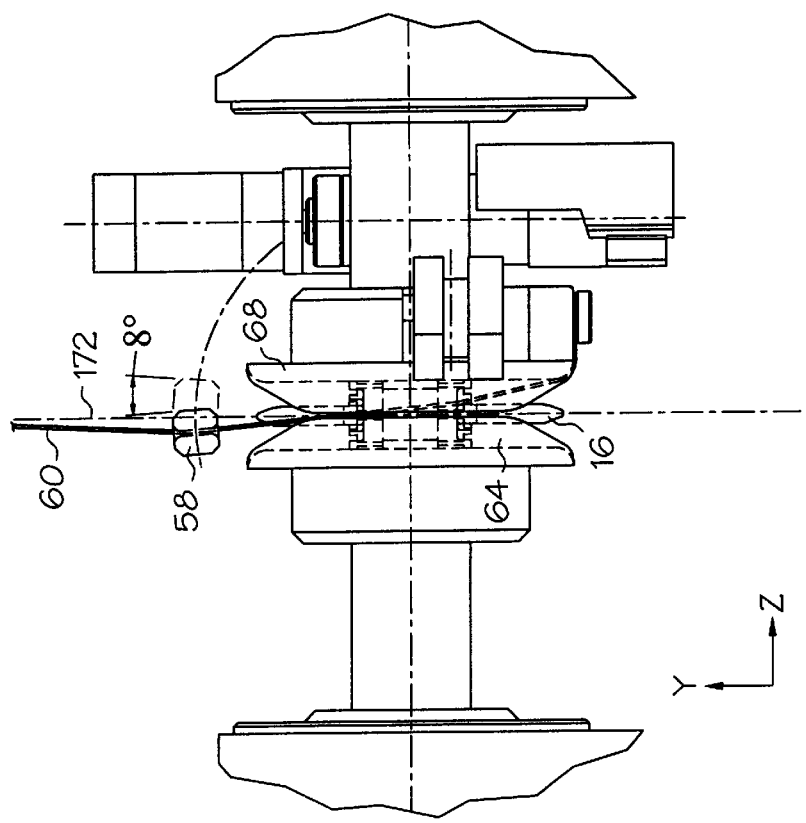

Once sufficient windings are located in the first 21 and fourth 27 slots on the right hand side of the shaft 16, the stator core 12 is stopped after a 90° rotation about the Z-axis. In this position, the shaft 16 of the stator core 12 is parallel to the Y-axis (i.e., held vertically) as shown in FIG. 19. The wire guide 58 is then shifted to its second position where it is offset from the vertical center 172 of the stator core 12 on the left hand side of the center 172, The wire guide 58 pulls the wire bundle 60 with it as it shifts in position. The movement of the wire guide 58 is driven by the wire guide servo motor 128. The stator core 12 and winding tools 64, 68 are then rotated for a predetermined number of rotations about the Z-axis to wind the wire bundle 60 into the first 21 and fourth slot 27 on the left hand side of the shaft 16, as shown in FIG. 20. This portion of the windings is shown as windings 312 in FIG. 1A. The rotation of the winding tools 64, 68 and stator core 12 is driven by the servo motor 150. Once sufficient windings are located in the left hand side of the first 21 and fourth 27 slots, the wire bundle 60 must then be wound into the third 25 and sixth 31 slots, as will be discussed next.

Figure 21:
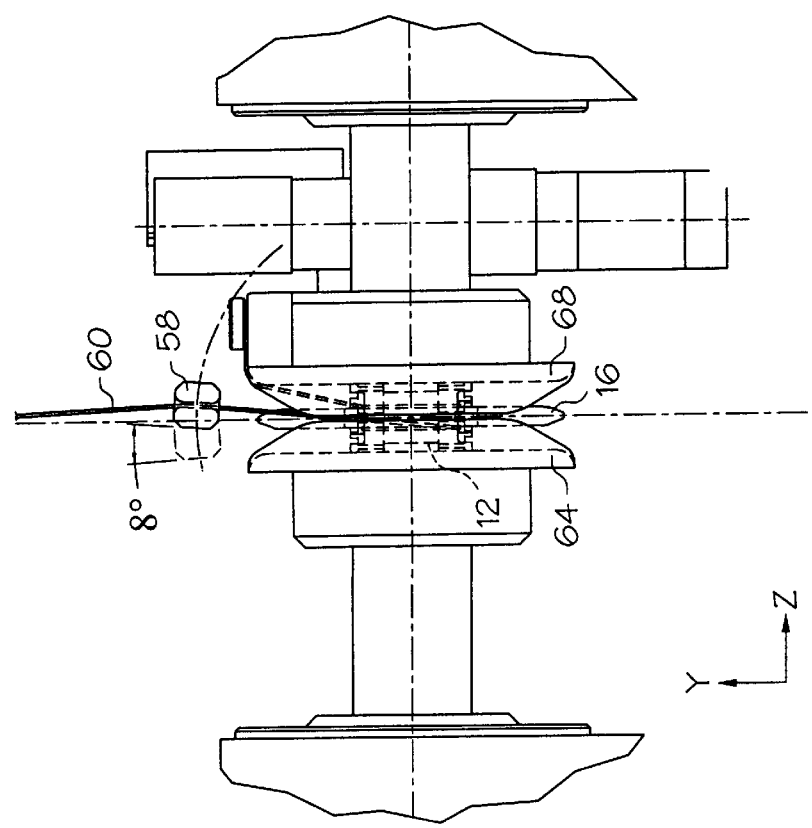

In order to shift the radial position of the stator core 12, the rotation of the stator core 12 and winding tools 64, 68 about the Z-axis is stopped such that the stator core 12 is parallel to the Y-axis, as shown in FIG. 21. The wire guide 58 is then moved to the first position such that the wire guide 58 is located on the right hand side of the shaft 16, as shown in FIG. 21. Next, the winding tools 64, 68 and stator core 12 are rotated another 90 degrees about the Z-axis so that the shaft 16 of the stator core 12 extends horizontally. The wire clamp 130 is then moved to the unclamped position by pushing the clamp head 132 away from the block 131 to release the bundle of wires 60.

Next, the stop locator 54 is extended by the locator cylinder 204. The stop locator 54 contacts the second shroud 15 of the stator core 12 so that the stator core 12 is located in the proper position to be gripped by the collet 22 (FIG. 5). The loading assembly 24 (FIG. 1) is then moved in the +X direction as powered by the rail cylinder 52. The motion of the loading assembly 24 is stopped when the first shroud 13 of the stator core 12 contacts the stripper bar 43. At this point the shroud 13 is located inside the collet 22, but is not clamped by the collet 22. The draw bar shaft 35 in the loading assembly 24 is then pulled in the −X direction by the collet clamping cylinder 33 to clamp the shroud 13 in the collet mechanism 37 located at the end of the draw bar shaft 35.

With the stator core 12 clamped by the collet 22 as well as being forced against the stop locator 54, the secondary and primary winding tools 64, 68 are moved away from the stator core 12 to unclamp the stator core 12. The winding tools 64, 68 are disengaged from the stator core 12 by moving the tooling assemblies 62, 66 along the slide rails 262, 264 away from the stator core 12 (FIG. 8). The tooling assemblies 62, 66 are moved in this manner by introducing air into the clamp cylinder 95 on the right hand side of the piston 97, and removing air from the left hand side of the piston 97. This causes the piston 97 and outer casing 105 of the clamp cylinder 95 to want to move away from each other. This causes the piston 97 and secondary tooling assembly 62 move in the −X direction until the secondary open stop 82 hits the secondary block 72. The primary tooling assembly 66 is held in position by the air spring 90 while the secondary tooling assembly 62 is moving in the −X direction. Once the secondary open stop 82 hits the secondary block 72 the movement of the secondary tooling assembly 62 in the −X direction is halted. At this point the outer casing 105 of the clamp cylinder 95 overcomes the force applied by the air spring 90 (as urged by the pressure in the clamp cylinder 95). In this manner the primary tooling assembly 66 is moved in the +X direction until the primary open stop 84 hits the primary block 76. At this point, the winding tools 64, 68 are disengaged from the stator core 12.

Figure 22:
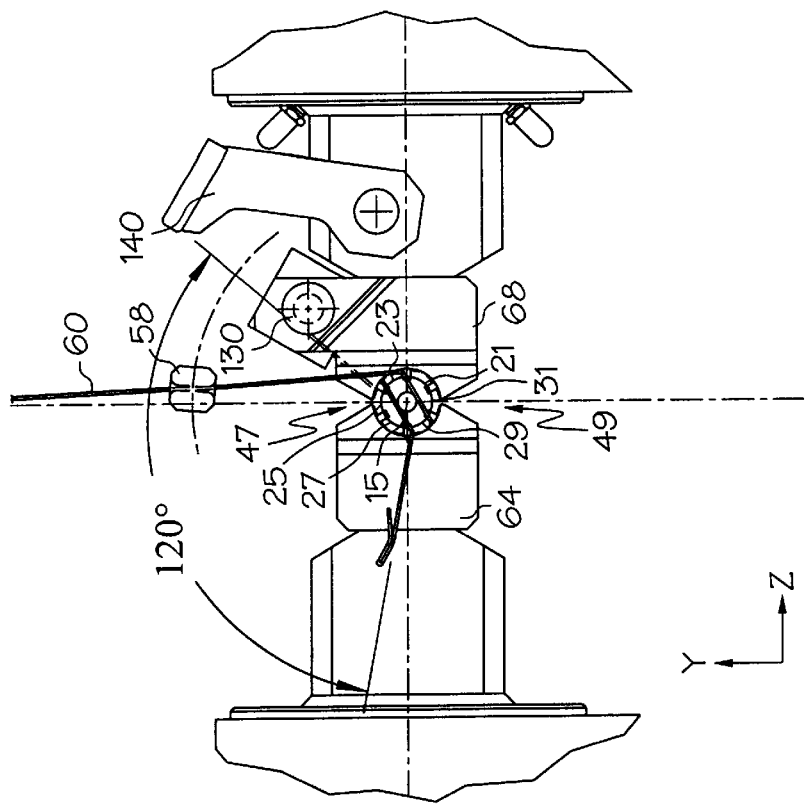

The servo positioning motor 180 (FIG. 2) then drives the bearing spindle 19 such that the bearing spindle 19, collet 22 and stator core 12 gripped in the stator core are rotated 120° about the X-axis. As shown in FIG. 22, after the stator core 12 is rotated the 120°, the third slot 25 is aligned with the upper gap 47 between the winding tools 64, 68, and the sixth slot 31 is aligned with the lower gap 49 between the winding tools 64, 68. In this manner the third 25 and sixth 31 slots are aligned to accept the wire bundle 60 passed through the wire guide 58. Next, the tooling assemblies 62, 66 are moved inwardly to grip the stator core 12 between the winding tools 64, 68, as powered by the air spring 90 and clamp cylinder 92. Next, the pressure on both sides of the rail cylinder 52 is eliminated to allow the stripper bar 43 to operate. The collet 22 then releases the stator core 12 and the stripper bar 43 is activated in the same manner described earlier such that stator core 12 is disengaged from the loading assembly 24 such that the shroud 13 is not stripped off of the stator core 12. The loading assembly 24 is then moved in the −X direction to move the loading assembly 24 to its home position. The stripper bar 43 and stop locator 54 are then retracted to their home positions.

Figure 24:
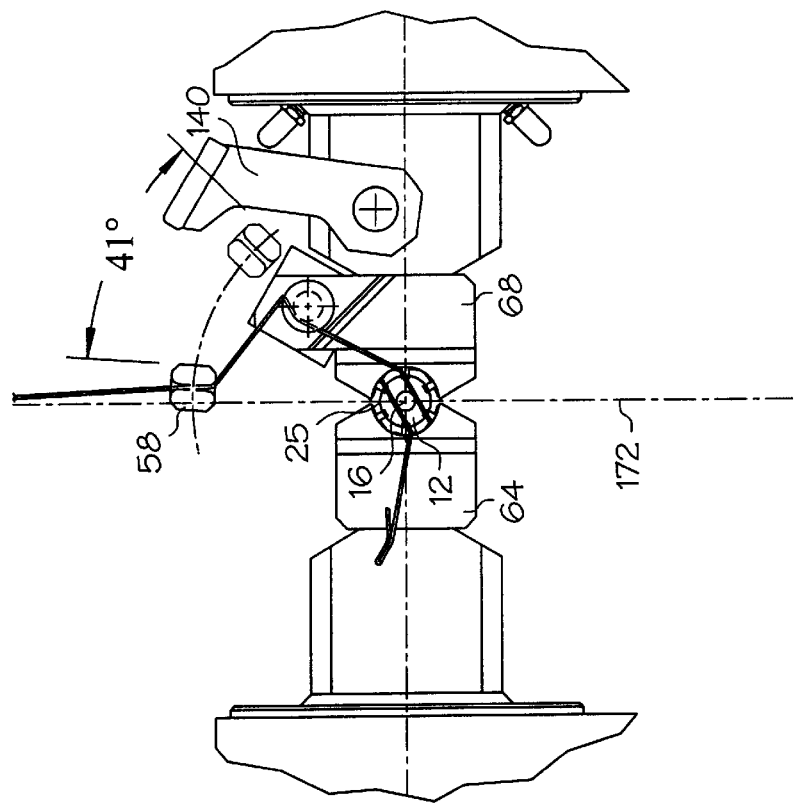
Figure 23:
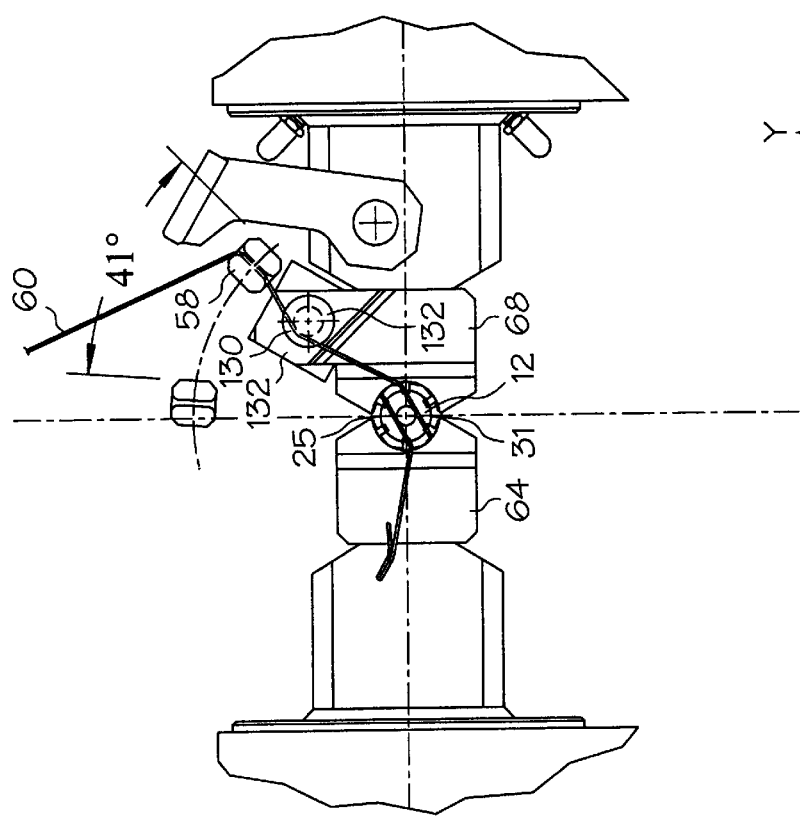

As shown in FIG. 23, the wire guide 58 then moves to the clamp position to bring the wire bundle 60 into position between the clamp head 132 and the stationary block 133. This places the wire bundle 60 in a position to be clamped by the wire clamp 130. The clamp head 132 is then moved toward the stationary block 133 and clamps the wire bundle 60 between the clamp head 132 and the stationary block 133. As shown in FIG. 24, the wire guide 58 is then moved to the first position, wherein it is offset slightly from the vertical center 172 of the stator core 12. The wire bundle 60 remains clamped as the wire guide 58 moves to the first position.

Figure 28:
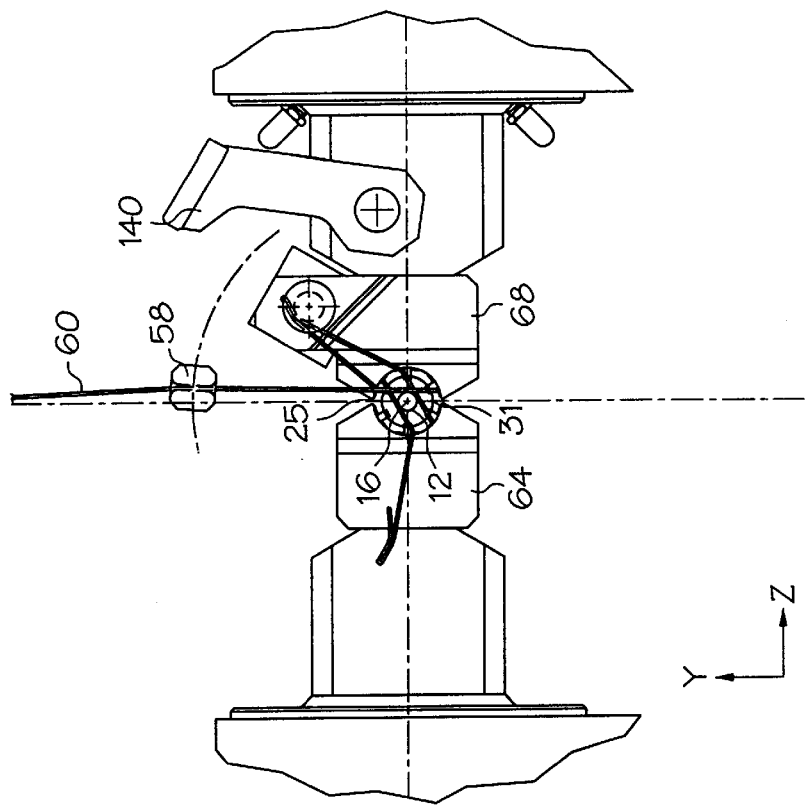
Figure 27:
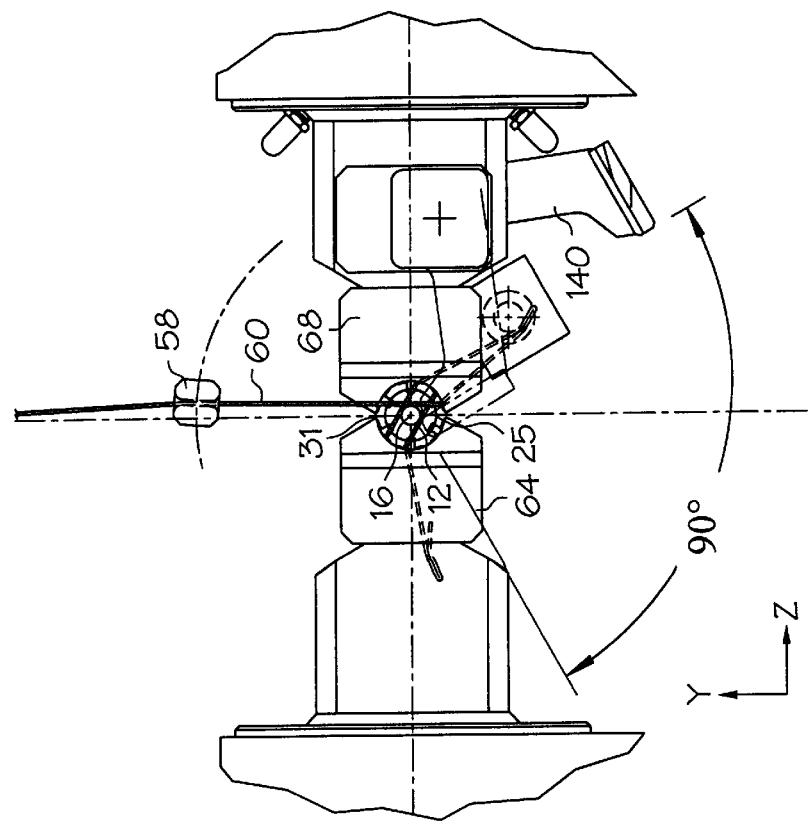
Figure 30:
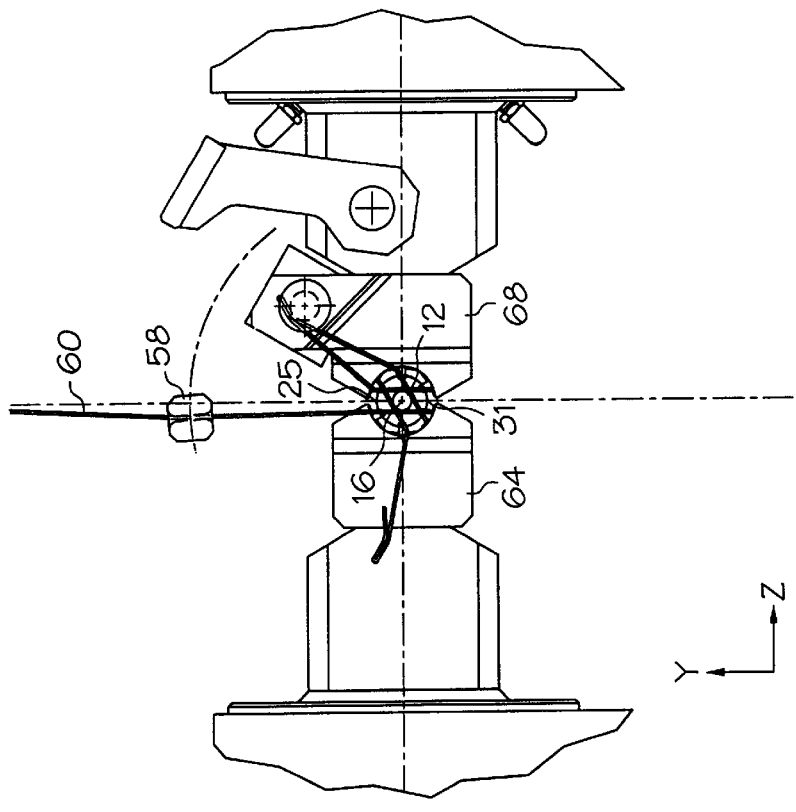

The wire guide rail 140 is then moved into the engaged position to urge the wire bundle 60 into the space between the winding tools 64, 68 such that the wire bundle 60 can be urged into the third slot 25, as shown in FIG. 25. Next, as shown in FIG. 26, the primary tooling assembly shaft 218, the primary winding tool 68, the secondary tooling assembly shaft 219, secondary winding tool 64, and stator core 12 are then rotated 180° about the Z-axis to urge the bundle of wires 60 into the third slot 25 on the right hand side of the shaft 16. After the 180° rotation, the wire bundle 60 is trapped under the tip of the primary winding tool 68. The wire guide rail 140 is then moved to the disengaged position as shown in FIG. 27, as it is no longer needed to retain the wire bundle in the third slot 25. The winding tools 64, 68 and stator core 12 are then rotated 180° about the Z-axis to force the wire bundle 60 into the sixth slot 31 of the stator core 12 on the right hand side of the shaft 16, as shown in FIG. 28. The stator core 12 and winding tools 64, 68 are then rotated for successive rotations about the Z-axis until the desired amount of windings are placed in the third and sixth slots on the right hand side of the shaft 16. This portion of the windings is shown as portion 314 in FIG. 1A.

Figure 29:
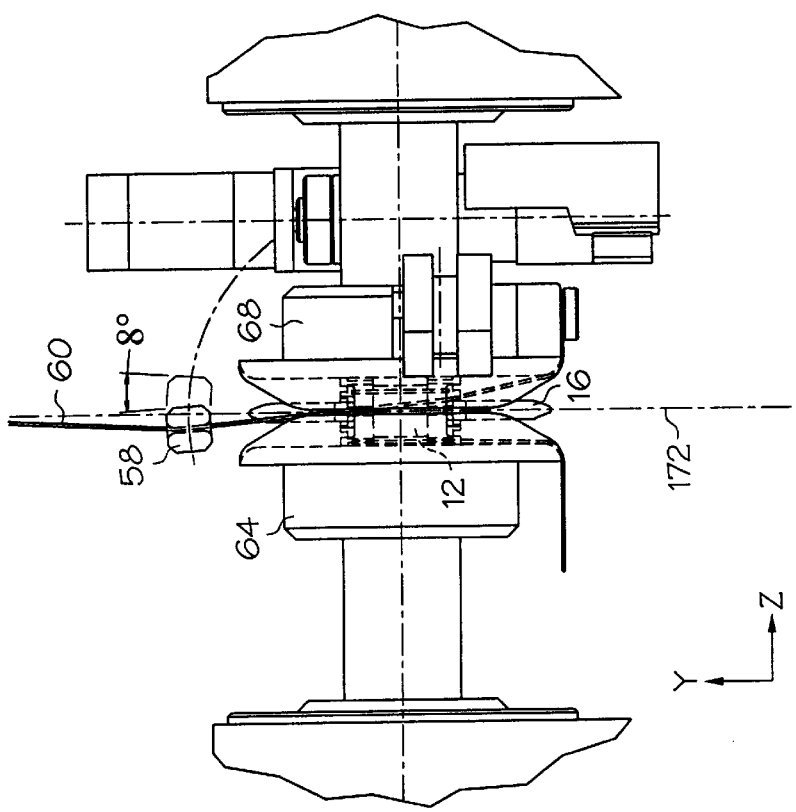

Next, as shown in FIG. 29, the winding tools 64, 68 and stator core 12 are stopped after a 90° rotation about the Z-axis such that the shaft 16 of the stator core 12 is vertical (parallel to the Y-axis). The wire guide 58 is shifted to the second position on the left hand side of the center line 172 of the stator core 12. The winding tools 64, 68 and stator core 12 are then rotated for a predetermined number of successive rotations about the Z-axis until the desired amount of windings are located in the third 25 and sixth 31 slots on the left hand side of the shaft 16. This portion of the windings is shown as portion 316 in FIG. 1A.

Figure 32:
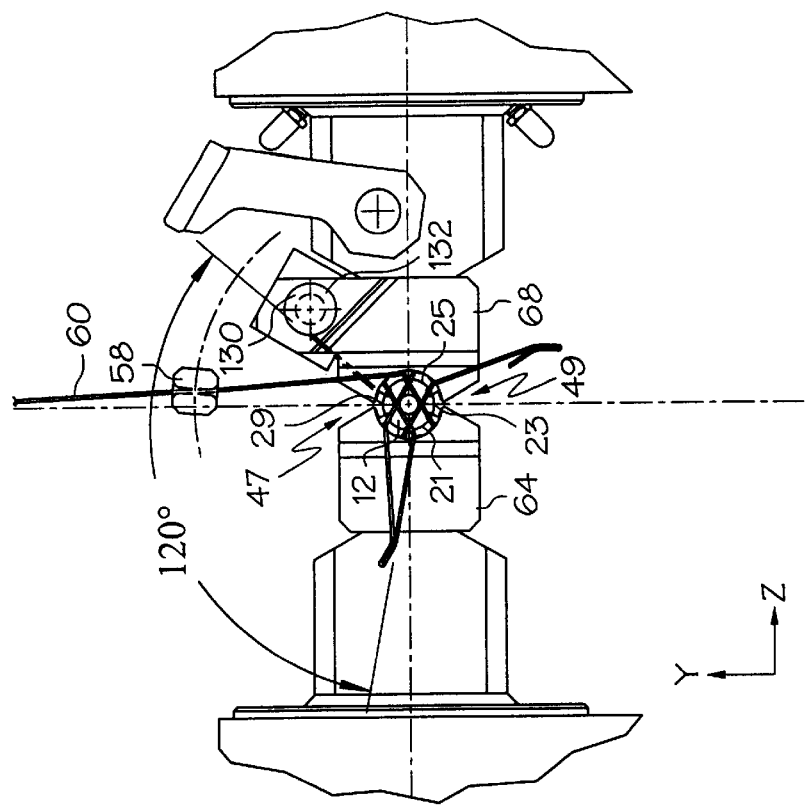
Figure 31:
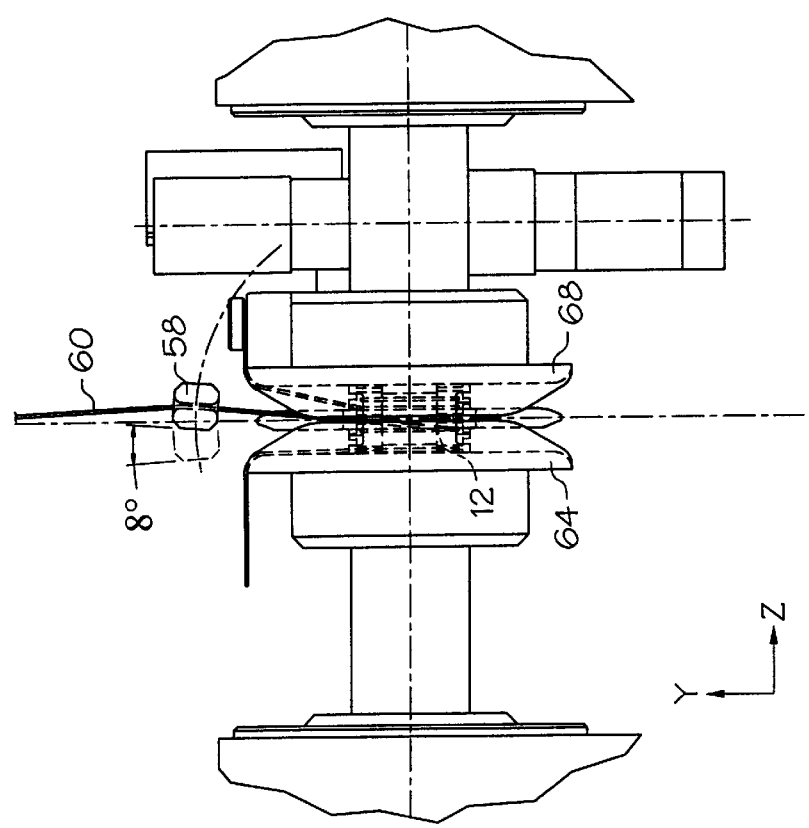
Figure 34:
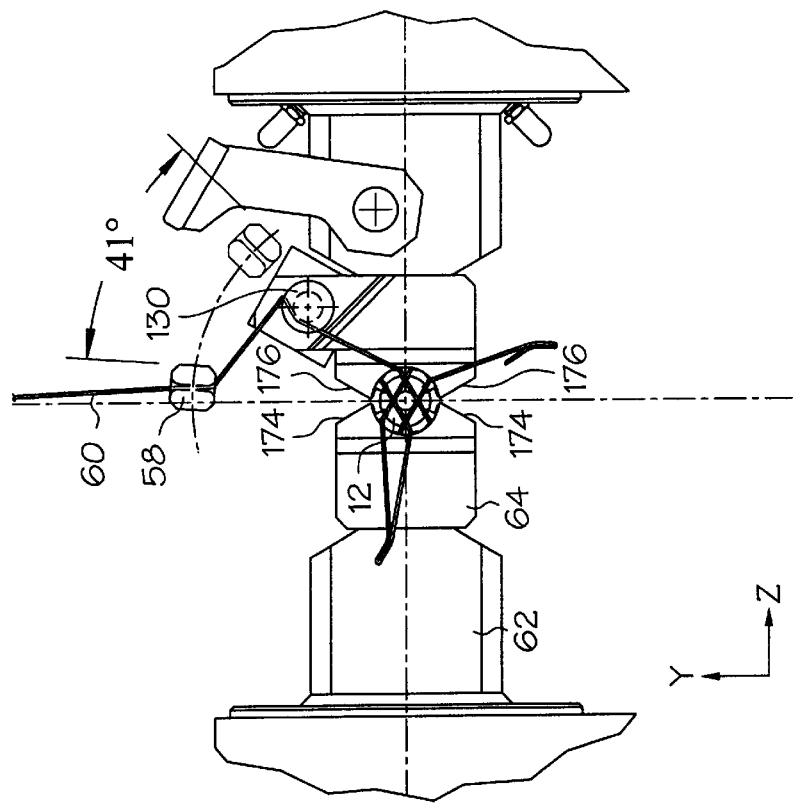
Figure 33:
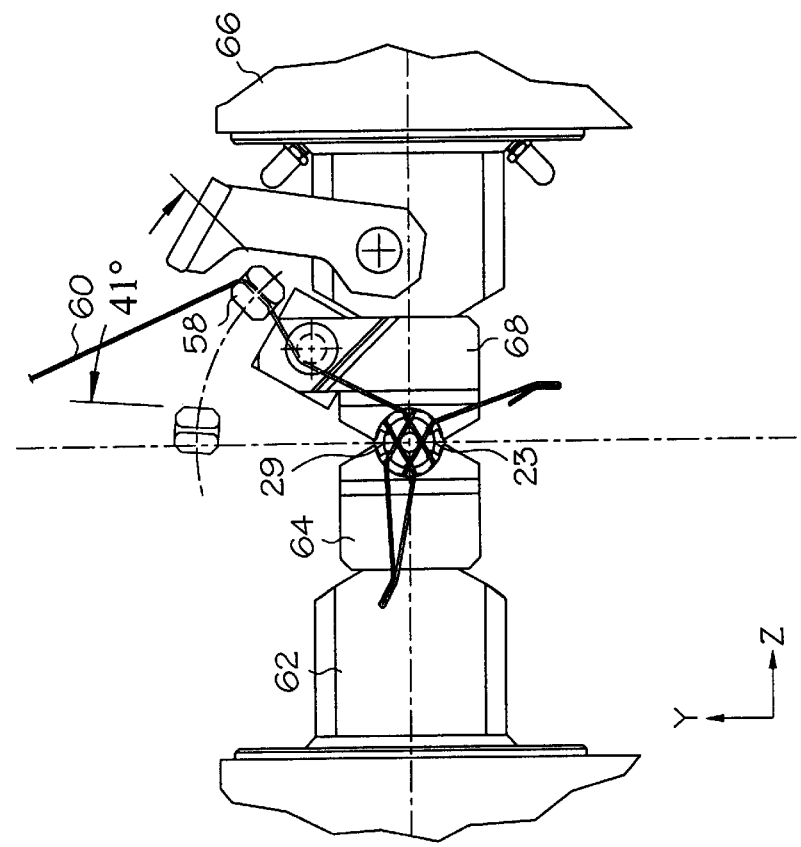
Figure 36:
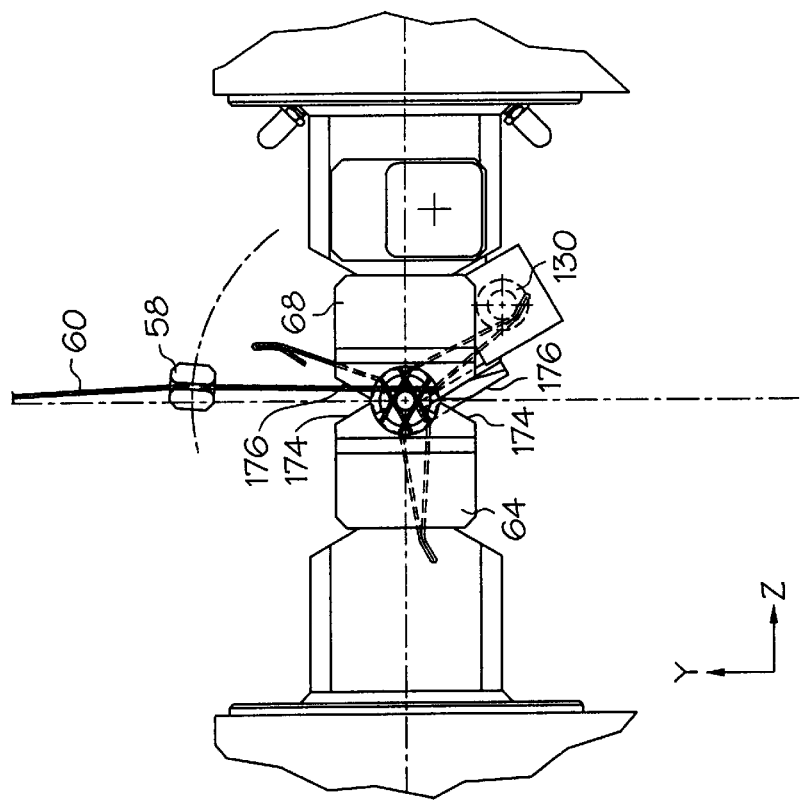
Figure 35:
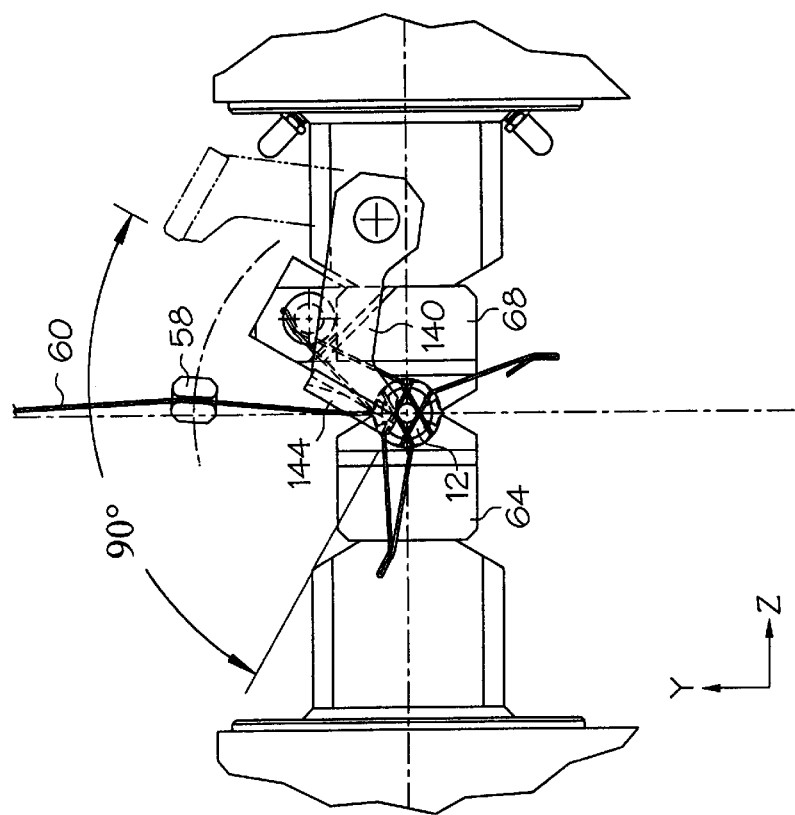
Figure 38:
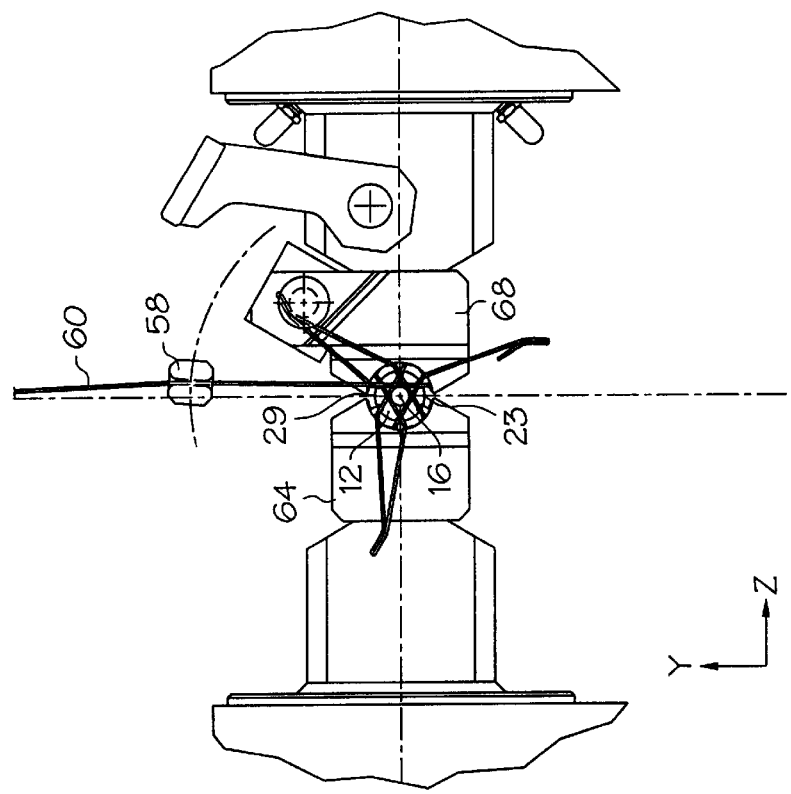
Figure 37:
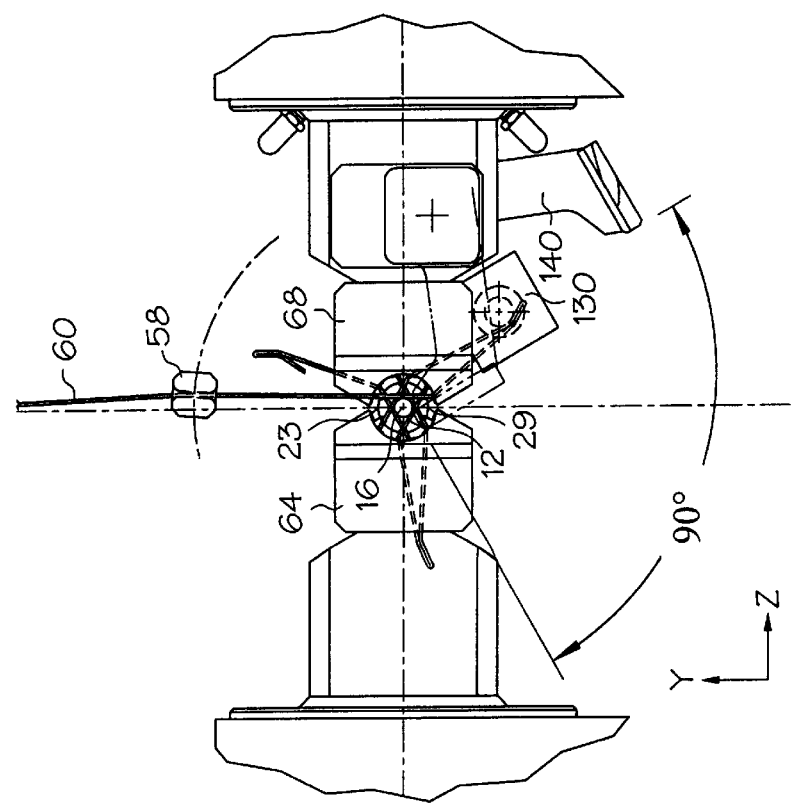
Figure 40:
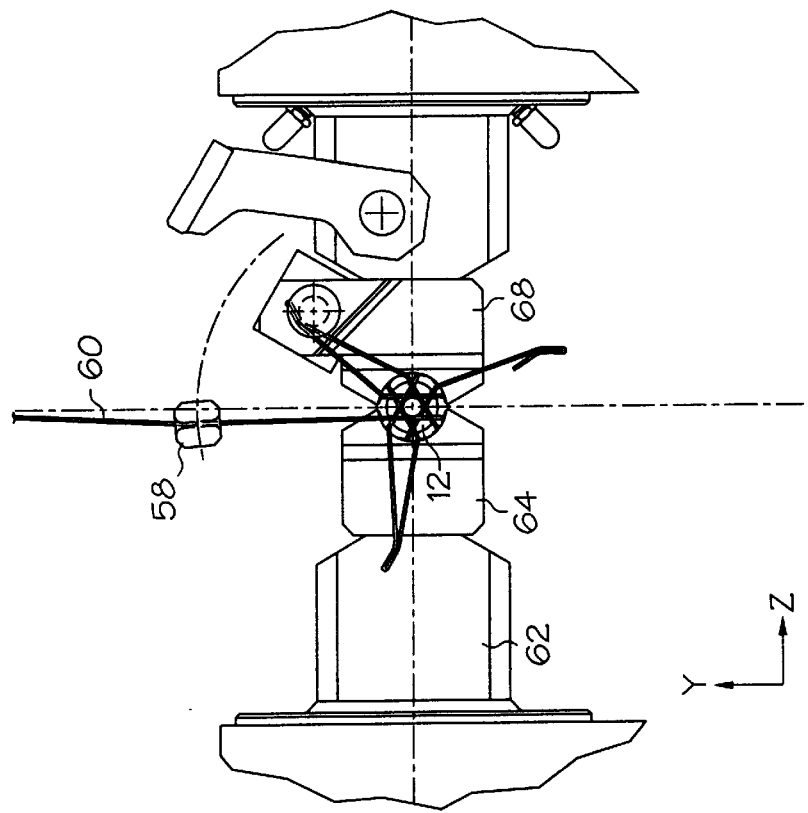
Figure 39:
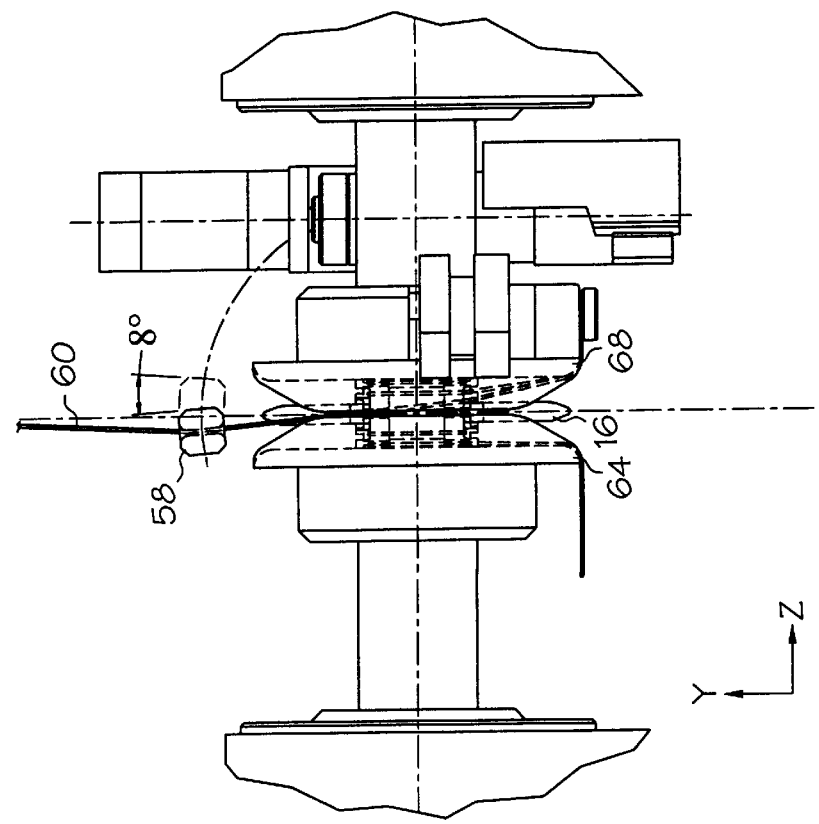
Figure 43:
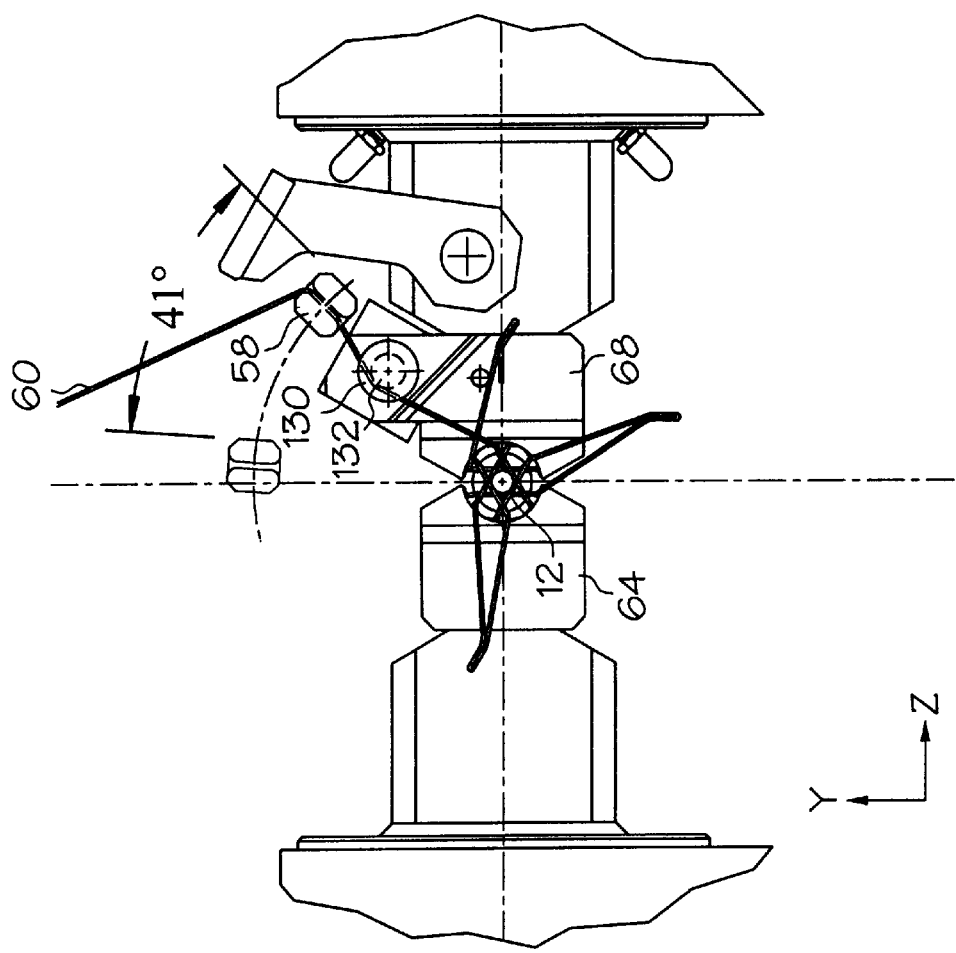

Once the desired amount of windings are placed in the third 25 and sixth 31 slots, the stator core 12 and winding tools 64, 68 are stopped such that the shaft 16 of the stator core is vertically oriented. The wire guide 58 is then shifted to its first position, pulling the wire bundle 60 with it as shown in FIG. 31. Next, the stator core 12 and winding tools 64, 68 are then rotated another 90° about the Z-axis to bring the stator core 12 to the home position. The wire clamp 130 is then moved to the unclamped position to release the wire bundle 60. The loading assembly 24 is then moved into position such that the collet 22 grips the shaft 16 of the stator core 12 using the same procedures outlined above. The winding tools 64, 68 are disengaged from the stator core 12. The stator core 12 is then rotated another 120° about the X-axis by the loading assembly 24 such that the fifth 29 and second 23 slots of the stator core 12 are aligned in the gaps 47, 49 between the winding tools 64, 68, as shown in FIG. 32.

The winding tools 64, 68 then move forward to engage the stator core 12, and the collet 22 releases and disengages from the shaft 16 in the same manner as described earlier. The same winding sequence of operations as discussed above is then carried out to wind the wire bundle 60 into the fifth 29 and second 23 slots on either side of the shaft 16. These operations are illustrated in FIGS. 33–41. The windings placed in the slots 29, 23 are shown in FIG. 1A as sections 318, 320. Once the winding operations in the fifth 29 and second 23 slots are completed, the stator core 12 and winding tools 64, 68 are gripped and rotated to 120 degrees about the X-axis by the loading assembly 24 as described earlier to bring the stator core 12 to the position shown in FIG. 42. As shown in FIG. 42, the primary tooling assembly 66 includes a pin 181 such that the protruding windings or intermediate windings 182 are blocked from interfering with the wire clamp 130 as the stator core 12 is rotated about its shaft 16.

The wire guide 58 moves to the clamp position to bring the wire bundle 60 into position to be clamped by the wire clamp 130. The clamp head 132 is then moved against the block 133 to trap the wire bundle 60 between the clamp head 132 and the block 133. Next, a cutting assembly 137 (shown in FIG. 5), extends forwardly and cuts the wire bundle 60 extending between the wire clamp 130 and the stator core 12. The cutting assembly 137 is then retracted to its home position. The cutting assembly 137 is coupled to the locator assembly 56. In this manner if the locator assembly 56 is adjusted along the X-axis to accommodate differently sized stator cores, the cutting assembly 137 is also adjusted so that it cuts the wound stator core in the proper position.

The clamping mechanism of the wire clamp 130 makes it possible to cut the wound wire bundle between coils which eliminates loose clippings or the requirement to pull taps during a winding. For example, the protruding windings 182 shown in FIG. 42 may be cut during the winding operations, if desired. Cutting the protruding windings 182 electrically isolates the various windings. The shape and orientation of the protruding windings 182 is formed during the winding operations due to the cooperation between the wire clamp 130 and the wire guide 58 during winding operations. The protruding windings 182 provide a convenient lead to be cut, if desired, and the cut wires are relatively small which reduces loose clippings. The protruding windings 182 may be cut at different locations to identify the different protruding windings 182 (i.e. the start winding, the finish winding, etc.)

In order to complete the winding operations, the winding assembly 10 follows the same steps outlined above for causing the collet 22 to grip the stator core. That is, the stop locator 54 is extended, the loading assembly 24 moves in the +X direction such that the shaft 16 of the stator core 12 is received in the collet 22, and the draw bar shaft 35 is activated to cause the collet mechanism 37 to clamp onto the stator core 12. With the stator core 12 clamped by the collet 22 as well as being forced against the stop locator 54, the winding tools 64, 68 are then moved away from the stator core to unclamp the stator core 12. The loading assembly 24 is then moved in the −X direction by the rail cylinder 52, bringing the stator core 12 with it. The operator then grasps the wound stator and actuates a "complete cycle" button (not shown). The "complete cycle" button triggers the collet clamping cylinder 33 to be reversed to cause the collet mechanism 37 to unclamp the stator core 12. The stripper cylinder 39 is activated to cause the stripper bar 43 to move in the +X direction. The stripper bar 43 engages the shroud 13 and pushes the wound stator assembly out the collet 22 and into the hand of the operator, pushing the shroud 13 with the shaft 16 such that the shroud 13 is not stripped off of the shaft 16. Finally, the stripper cylinder 39 is reversed to enable the stripper bar to move to its home position, as urged by spring 45. At this point, the winding machine 10 is in position to accept an unwound stator core to perform winding operations.

Having described the invention in detail and by reference to the preferred embodiments, it will be apparent that modifications and variations thereof are possible without departing from the scope of the invention.

What is claimed is:

1. An apparatus for winding a wire about a component having a plurality of slots, the apparatus comprising:

a rotatable gripper mechanism for gripping said component and rotating said component about a transverse axis of said component, said gripper mechanism being shaped to guide said wire into a slot of said component; and a wire guide for receiving said wire and guiding said wire into said slot of said component as said component is rotated about said transverse axis, and wherein said wire guide is movable relative to said central shaft to guide said wire into said slot on either side of said shaft.

2. The apparatus of claim 1 wherein said wire guide orbits about an axis parallel to said shaft of said component to guide said wire into said slot on either side of said shaft.

3. The apparatus of claim 1 wherein said wire guide includes a slot through which said wire is passed.

4. The apparatus of claim 1 wherein said wire guide includes a hole through which said wire is passed.

5. The apparatus of claim 1 wherein said component includes a plurality of opposed pairs of slots, and wherein said apparatus winds said wire into a pair of opposed slots when said rotatable gripper mechanism rotates said component about said transverse axis.

6. The apparatus of claim 1 wherein said gripper mechanism includes a pair of surfaces located on either side of said slot, said surfaces being angled toward said slot to guide said wire into said slot.

7. The apparatus of claim 1 wherein said apparatus winds a bundle of wires about said component, and wherein said gripper mechanism and said wire guide are shaped to guide said wire bundle into said slot of said component.

8. The apparatus of claim 7 further comprising a plurality of wire sources, each wire source providing a unbundled wire that is combined with other unbundles wires to form said bundle of wires, the apparatus further including a plurality of tensioners through which each unbundled wire is fed.

9. The apparatus of claim 8 wherein each tensioner including a pair of pads through which an unbundled wire is fed, and wherein one of each of said pair of pads is mounted to a rotatable door such that when said door is rotated to an open position each pad mounted to said door moves away from its respective unbundled wire to release the tension in the unbundled wire.

10. The apparatus of claim 1 wherein said rotatable gripper mechanism includes a pair of winding tools, each winding tool being movable toward and away from said component to grip said component therebetween.

11. The apparatus of claim 10 wherein said winding tools are movable along said transverse axis of said component.

12. The apparatus of claim 10 wherein said winding tools are individually rotatable about said transverse axis of said component to adjust said winding tools before winding said wire about said component.

13. The apparatus of claim 10 wherein each winding tool includes an engagement surface that is shaped to closely receive said component therein.

14. The apparatus of claim 1 further comprising a clamp for clamping said wire when said rotatable gripper mechanism rotates said component about said transverse axis.

15. The apparatus of claim 14 wherein said clamp is rotatable with said component when said component is rotated about said transverse axis.

16. The apparatus of claim 14 wherein said clamp includes a clamp head that is reciprocal between a clamped position wherein said clamp head is located adjacent a stationary block to an unclamped position wherein said clamp head is spaced apart from said stationary block, and wherein said clamp can clamp a wire between said clamp head and said stationary wire when said clamp head is in said clamped position.

17. The apparatus of claim 14 wherein said wire guide is movable to a clamp position to bring said wire in a position to be clamped by said clamp.

18. The apparatus of claim 1 further comprising a wire guide rail for urging said wire into a position such that said wire is located adjacent said slot of said component such that said wire is wound into said slot when said component is rotated about said transverse axis.

19. The apparatus of claim 18 wherein said wire guide rail is rotatable with said component when said component is rotated about said transverse axis.

20. The apparatus of claim 18 wherein said wire guide rail is movable from an engaged position wherein said wire guide rail urges said wire adjacent a slot of said component, to a retracted position wherein said wire guide rail is retracted from said component.

21. The apparatus of claim 1 further comprising a rotation assembly for rotating said component about a central axis of said component to bring other slots of said component into position for receiving said wire therein.

22. The apparatus of claim 21 wherein said rotation[]assembly includes a collet for gripping said component.

23. The apparatus of claim 21 wherein said component includes a shaft and pair of shrouds located on either end of said shaft, and wherein said collet grips said component at one of said shrouds, and wherein said collet includes a stripper bar that urges said shroud out of said collet when said collet releases said shroud.

24. The apparatus of claim 1 further comprising a loading assembly that is shaped to receive and retain said component, and wherein said loading assembly can move a component retained therein into and out of a position to be gripped by said rotatable gripper mechanism.

25. The apparatus of claim 24 further comprising a locator bar that is located to contact a component moved by said loading assembly to stop the movement of said component at a position such that said component can be gripped by said rotatable gripper mechanism.

26. The apparatus of claim 25 wherein said locator bar is movable along the direction of movement of said component by said loading assembly.

27. The apparatus of claim 1 wherein said component is a stator core.

28. A method for winding a wire about a component comprising the steps of:

providing a component having a plurality of slots;

gripping said component in a gripper mechanism;

locating said wire adjacent a slot in said component; and rotating said component about a transverse axis of said component to urge said wire into said slot, wherein said gripper mechanism guides said wire into said slot, wherein said component includes a central shaft, and wherein during said rotating step said wire is urged into said slot such that said wire is located on a first side of said shaft, and wherein the method further comprises the step of adjusting the location of said wire and rotating said component about a transverse axis of said component to urge said wire into said slot such that said wire is located on a second side of said shaft.

29. The method of claim 28 wherein a bundle of wires are located adjacent said slot in said locating step, and said bundle of wires are urged into said slot during said rotating step.

30. The method of claim 28 wherein said wire is guided onto either side of said shaft by a wire guide that orbits about an axis parallel said shaft, and wherein said adjusting step includes rotating said shaft about said axis.

31. The method of claim 28 wherein said component includes a plurality of slot sets, each slot set including a pair of opposed slots, and wherein said wire is urged into each slot in a slot set when said component is rotated about said transverse axis.

32. The method of claim 28 wherein said gripper mechanism includes a pair of winding tools, and wherein said gripping step includes locating said component between said winding tools and moving said winding tools toward said component until said component is gripped between said pair of winding tools.

33. The method of claim 32 wherein said pair of winding tools are moved along said transverse axis when said winding tools are moved toward said component.

34. The method of claim 32 wherein said pair of winding tools includes a primary winding tool and a secondary winding tool, and wherein said gripping step includes moving said primary winding tool to engage and locate said component and then moving said secondary winding tool to engage said component such that said component is gripped between said winding tools.

35. The method of claim 28 further comprising the step of clamping said wire before said rotating step.

36. The method of claim 35 further comprising the step of rotating said component about a central axis of said component such that another slot of said component is positioned to receive said wire therein, and repeating said gripping, locating and rotating steps to wind said wire into said another slot.

37. The method of claim 36 further comprising the step of forming at least one intermediate winding that extends radially outwardly from said component.

38. The method of claim 28 wherein said locating step includes moving a wire guide that has said wire passed therethrough to a position wherein said wire is located adjacent a slot in said component.

39. The method of claim 38 wherein said wire guide moved to said position wherein said wire is located adjacent a slot in said component while a portion of said wire is clamped.

40. The method of claim 39 further comprising the step of urging said wire into said slot after said locating step and before said rotating step.

41. The method of claim 40 wherein said component includes a central shaft, and wherein during said rotating step said wire is urged into said slot such that said wire is located on a first side of said shaft, and method further comprising the step of moving said wire guide such that said wire is located on a second side of said shaft and rotating said component about a transverse axis of said component to urge said wire into said slot on said second side of said shaft.

42. The method of claim 41 further comprising the step of unclamping said wire.

43. The method of claim 42 further comprising the step of rotating said component about said shaft such that another slot is positioned to receive said wire therein.

44. The method of claim 43 further comprising the step of cutting said wire at a portion of said wire extending between said component and said clamp.

* * * * *